United States Patent
Ukai

(10) Patent No.: US 8,751,776 B2
(45) Date of Patent: Jun. 10, 2014

(54) METHOD FOR PREDICTING BRANCH TARGET ADDRESS BASED ON PREVIOUS PREDICTION

(71) Applicant: Fujitsu Limited, Kawasaki (JP)

(72) Inventor: Megumi Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/914,002

(22) Filed: Jun. 10, 2013

(65) Prior Publication Data

US 2013/0275726 A1    Oct. 17, 2013

Related U.S. Application Data

(63) Continuation of application No. PCT/JP2011/050189, filed on Jan. 7, 2011.

(51) Int. Cl.
    *G06F 9/40*    (2006.01)

(52) U.S. Cl.
    USPC ........... 712/239; 712/233; 712/234; 712/238; 712/240

(58) Field of Classification Search
    USPC .......................................... 712/239
    See application file for complete search history.

(56) References Cited

U.S. PATENT DOCUMENTS

| | | | |
|---|---|---|---|
| 2005/0114636 A1* | 5/2005 | McDonald et al. ........... | 712/238 |
| 2006/0149948 A1 | 7/2006 | Yokoi | |
| 2008/0288760 A1* | 11/2008 | Park et al. ................. | 712/238 |

FOREIGN PATENT DOCUMENTS

| | | |
|---|---|---|
| JP | 63-191231 A | 8/1988 |
| JP | 63-211462 | 9/1988 |
| JP | 3-127125 | 5/1991 |
| JP | 4-225429 | 8/1992 |
| JP | 9-500989 A | 1/1997 |
| JP | 2001-184231 | 7/2001 |
| JP | 2004-38323 | 2/2004 |
| JP | 2004-38337 | 2/2004 |
| JP | 2005-165950 | 6/2005 |
| JP | 2006-155374 | 6/2006 |
| WO | WO-94/27210 A1 | 11/1994 |

OTHER PUBLICATIONS

Tse-Yu Yeh, Yale N Patt, Alternative Implementations of Two-level Adaptive Branch Prediction, 1992, ACM, 124-134.*
Table, Dec. 4, 2008, Merriam Webster, p. 1.*
Hirashima, Tetsuro et al., "Branch Target Predictor Utilizing Context Base Value Predictor," IPSJ SIG Technical Reports, 2008-ARC-178, vol. 2008 No. 39, pp. 1 to 6, May 6, 2008 (English Abstract).

(Continued)

*Primary Examiner* — Robert Fennema
*Assistant Examiner* — Jyoti Mehta
(74) *Attorney, Agent, or Firm* — Fujitsu Patent Center

(57) ABSTRACT

A branch target address table is provided for each branch instruction having a plurality of branch targets. Each branch target address table stores a history of a plurality of branch target addresses determined in the past by executing a corresponding branch instruction. A branch target prediction unit predicts a predicted branch target address with respect to a branch instruction with reference to the history of branch target addresses stored in the branch target address table corresponding to the branch instruction. The predicted branch target address obtained as a result of the prediction is stored, for example, in a predicted branch target address storage unit in association with the branch instruction, and is referenced by an instruction fetch control unit at the time of prefetching a branch target instruction.

14 Claims, 25 Drawing Sheets

(56) References Cited

OTHER PUBLICATIONS

Chang, Po-Yung et al., "Target Prediction for Indirect Jumps," Conference Proceedings, The 24th Annual International Symposium on Computer Architecture 1997, pp. 274 to 283, Jun. 4, 1997.

Nair, Ravi, "Dynamic Path-Based Branch Correlation," Proceedings of the 28th Annual International Symposium on Microarchitecture 1995, pp. 15 to 23, Dec. 1, 1995.

International Search Report, mailed in connection with PCT/JP2011/050189 and mailed Mar. 22, 2011.

* cited by examiner

```
switch (a) {
        case a1: process Pa;
        break;
        case a2: process Pb;
        break;
        default: process Pc;
}
```

FIG. 5

METHOD FOR PREDICTING BRANCH TARGET ADDRESS BASED ON PREVIOUS PREDICTION

CROSS-REFERENCE TO RELATED APPLICATION

This application is a continuation application of International Application PCT/JP2011/050189 filed on Jan. 7, 2011 which designated the U.S., the entire contents of which are incorporated herein by reference.

FIELD

The embodiments discussed herein are related to an arithmetic processing apparatus and branch prediction method.

BACKGROUND

For improving the processing performance of arithmetic processing apparatuses such as CPUs (Central Processing Unit), etc., there have been known techniques by which a next instruction is speculatively executed without waiting for the current instruction to be executed. However, in the case of branch instructions, a branch instruction needs to be finished before a next instruction starts because the address of the next instruction is determined by executing the branch instruction. To deal with this, branch prediction techniques have widely been used, which predict the address of a next instruction, so as to start the execution of the next instruction before the branch instruction is executed.

One of the known branch prediction techniques uses information indicating a history of past branches called a branch history or global history in order to predict a branch target. Further, to improve the accuracy of branch prediction for a return instruction to return from a subroutine, there has been known a technique of pushing a return destination address for a return instruction on a return address stack when executing a call instruction to call the subroutine, and then popping the branch target as a prediction from the return address stack when executing the return instruction. Still further, for using a general-purpose register to generate branch target addresses of branch instructions, there has also been a branch prediction technique of managing changes in the contents of the general-purpose register used to generate branch target addresses, and determining based on the changes whether a result of a branch prediction based on a branch history is correct or not.

As another reference technique, there has been a program development support apparatus for debugging, which obtains a plurality of branch target addresses corresponding to a branch instruction and the frequency of each branch target through simulation, registers them in a table, and predicts the address of a next instruction with reference to this table.

Japanese Laid-open Patent Publication No. 2006-155374
Japanese Laid-open Patent Publication No. 4-225429
Japanese Laid-open Patent Publication No. 2001-184231

Out of branch instructions, instructions such as conditional branches, unconditional branches, subroutine calls, etc. each have a fixed branch target instruction address. On the other hand, like instructions represented as switch/case statements in C language, there are instructions that each have a plurality of branch targets according to conditions. In executing a branch instruction having a plurality of branch targets, it is difficult to predict a branch target because, even if it is predictable whether a branch will be taken or not-taken, the address of the branch target instruction is determined by executing the previous instruction.

SUMMARY

According to an aspect of the embodiments, an arithmetic processing apparatus includes: a plurality of branch target address tables provided for respective branch instructions each having a plurality of branch targets and configured to store a history of a plurality of branch target addresses determined in a past by executing the respective branch instructions; and a branch target prediction unit configured to predict a predicted branch target address with respect to a branch instruction with reference to the history of the branch target addresses stored in a branch target address table corresponding to the branch instruction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a program for executing a table jump instruction;

DESCRIPTION OF EMBODIMENTS

Hereinafter, embodiments of the present invention will be explained with reference to the accompanying drawings.

First Embodiment

Figure 1:
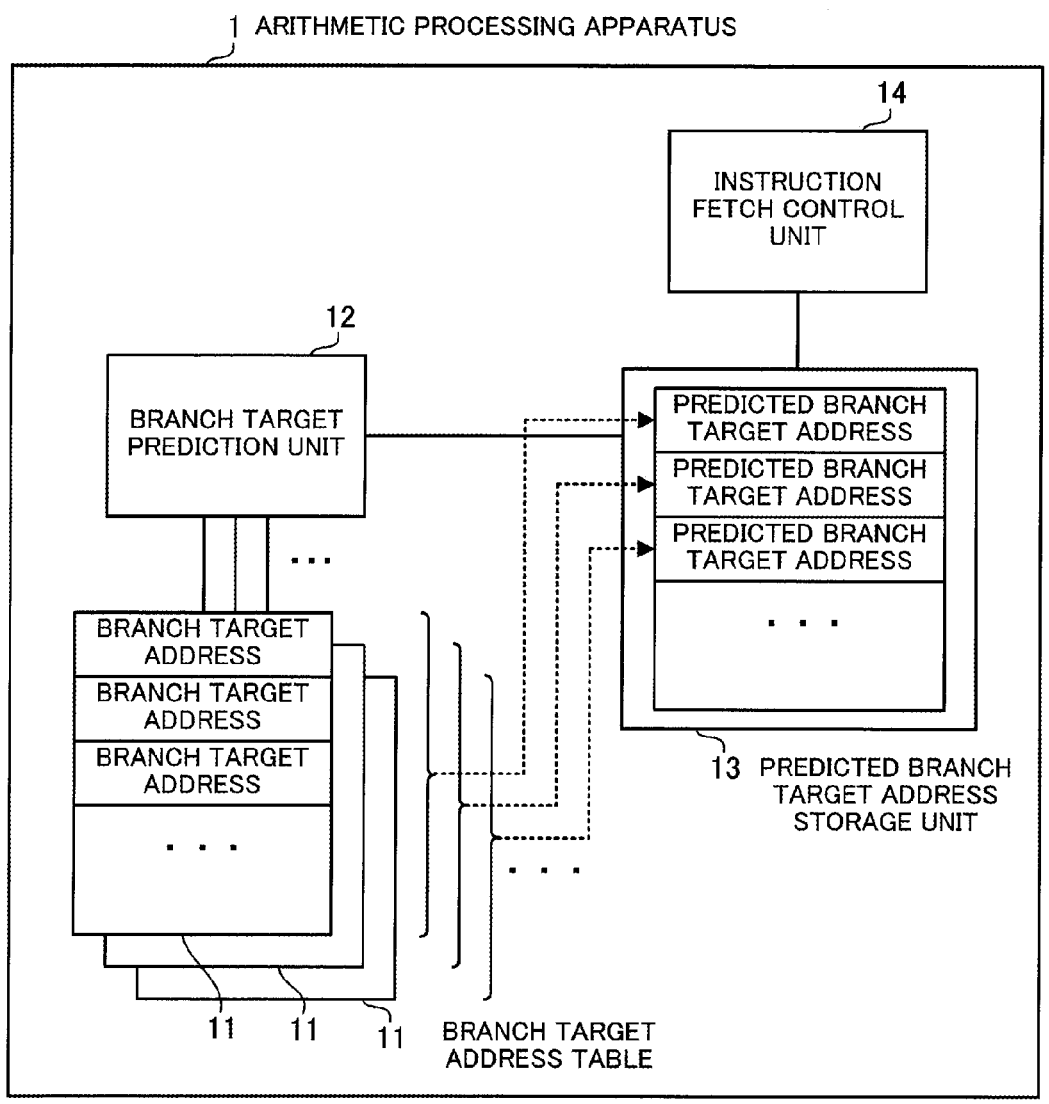
FIG. 1 illustrates an example of a configuration of an arithmetic processing apparatus according to a first embodiment.

FIG. 1 illustrates an example of a configuration of an arithmetic processing apparatus according to a first embodiment.

An arithmetic processing apparatus 1 illustrated in FIG. 1 is designed to read an instruction from a predetermined address in a memory (not illustrated), decode the read instruction, and perform processing according to the decoding result. In general, this arithmetic processing apparatus 1 is implemented, for example, by using a semiconductor circuit called CPU, MPU (Microprocessor Unit), etc. In addition, the arithmetic processing apparatus 1 is provided with a function of predicting a branch target address with respect to a branch instruction, and prefetching, based on the prediction result, the branch target instruction from the memory before the branch instruction completes its execution.

To realize the processing function of predicting branch target addresses with respect to branch instructions each having a plurality of branch targets, out of branch instructions, the arithmetic processing apparatus 1 includes a plurality of branch target address tables 11 and a branch target prediction unit 12. A branch target address table 11 is provided for each branch instruction having a plurality of branch targets, and stores a history of a plurality of branch target addresses that were determined in the past by executing the branch instruction. The branch target prediction unit 12 predicts a predicted branch target address with respect to a branch instruction having a plurality of branch targets with reference to the history of branch target addresses stored in the branch target address table 11 corresponding to the branch instruction.

In addition, predicted branch target addresses predicted by the branch target prediction unit 12 may be registered in a predicted branch target address storage unit 13. The predicted branch target address storage unit is able to store one predicted branch target address for the address of each branch instruction. This predicted branch target address storage unit 13 is referenced by, for example, an instruction fetch control unit 14 that controls instruction fetch. When fetching a branch instruction from the memory, the instruction fetch control unit 14 obtains a predicted branch target address corresponding to the address of the branch instruction from the predicted branch target address storage unit 13, and prefetches the branch target instruction from the obtained predicted branch target address.

The following describes a process of registration to the branch target address table 11 and a process of predicting a branch target. In this connection, in the first embodiment described below, the branch target prediction unit 12 is designed to perform the process of registration to the branch target address table 11 as well. Alternatively, a processing unit different from the branch target prediction unit 12 may be designed to perform the process of registration to the branch target address table 11. In addition, in the first embodiment described below, a branch instruction having a plurality of branch targets is simply referred to as a "branch instruction".

When a branch instruction completes its execution and a branch target address of the branch instruction is fixed, the branch target prediction unit 12 selects the branch target address table 11 corresponding to the completed branch instruction. Then, the branch target prediction unit 12 registers the fixed branch target address in the selected branch target address table 11.

In this connection, branch target addresses may be registered in the branch target address table 11 according to necessity. For example, the branch target prediction unit 12 may register branch target addresses until the branch target address table 11 has no free entries. Alternatively, it may be determined whether to register the branch target address of a branch instruction that has completed its execution, depending on whether the branch target prediction based on a predicted branch target address predicted by the branch target prediction unit 12 is correct or not. For example, the branch target prediction unit 12 sequentially registers a branch target address in the branch target address table 11 each time a branch instruction completes its execution after a branch target prediction starts until a correct prediction is obtained for the first time. Then, after the correct prediction is obtained, the branch target prediction unit 12 does not register branch target addresses.

The branch target prediction unit 12 determines, based on a history of branch target addresses registered in a branch target address table 11, a predicted branch target address with respect to the branch instruction corresponding to the branch target address table 11. The branch target prediction unit 12 selects one of the branch target addresses registered in the branch target address table 11 as a predicted branch target address, and registers the selected predicted branch target address in the predicted branch target address storage unit 13. The predicted branch target address output from the branch target address table 11 corresponding to the branch instruction is registered in association with the branch instruction in the predicted branch target address storage unit 13.

A predicted branch target address may be determined when a branch instruction completes its execution and then a process of reflecting a fixed branch target address on the branch target address table 11 is performed. If the branch target address table 11 contains a sufficient number of branch target addresses, for example, the branch target prediction unit 12 sequentially selects an entry in the branch target address table 11 in order from the first entry each time the branch instruction completes its execution. Then, the branch target prediction unit 12 registers the branch target address registered in the selected entry, as a predicted branch target address in the predicted branch target address storage unit 13.

In this connection, the arithmetic processing apparatus 1 may be designed so as to allow the instruction fetch control unit 14 to directly refer to predicted branch target addresses determined by the branch target prediction unit 12, without consulting the predicted branch target address storage unit 13.

In the above-described arithmetic processing apparatus 1, the branch target prediction unit 12 predicts one predicted branch target address for each branch instruction on the basis of a history of branch target addresses, which is registered for each branch instruction. This makes it possible to predict a predicted branch target address with respect to a branch instruction having a plurality of branch targets, improve the accuracy of predicting branch targets in the arithmetic processing apparatus 1, and thus improve the processing performance of the arithmetic processing apparatus 1.

Second Embodiment

Figure 2:
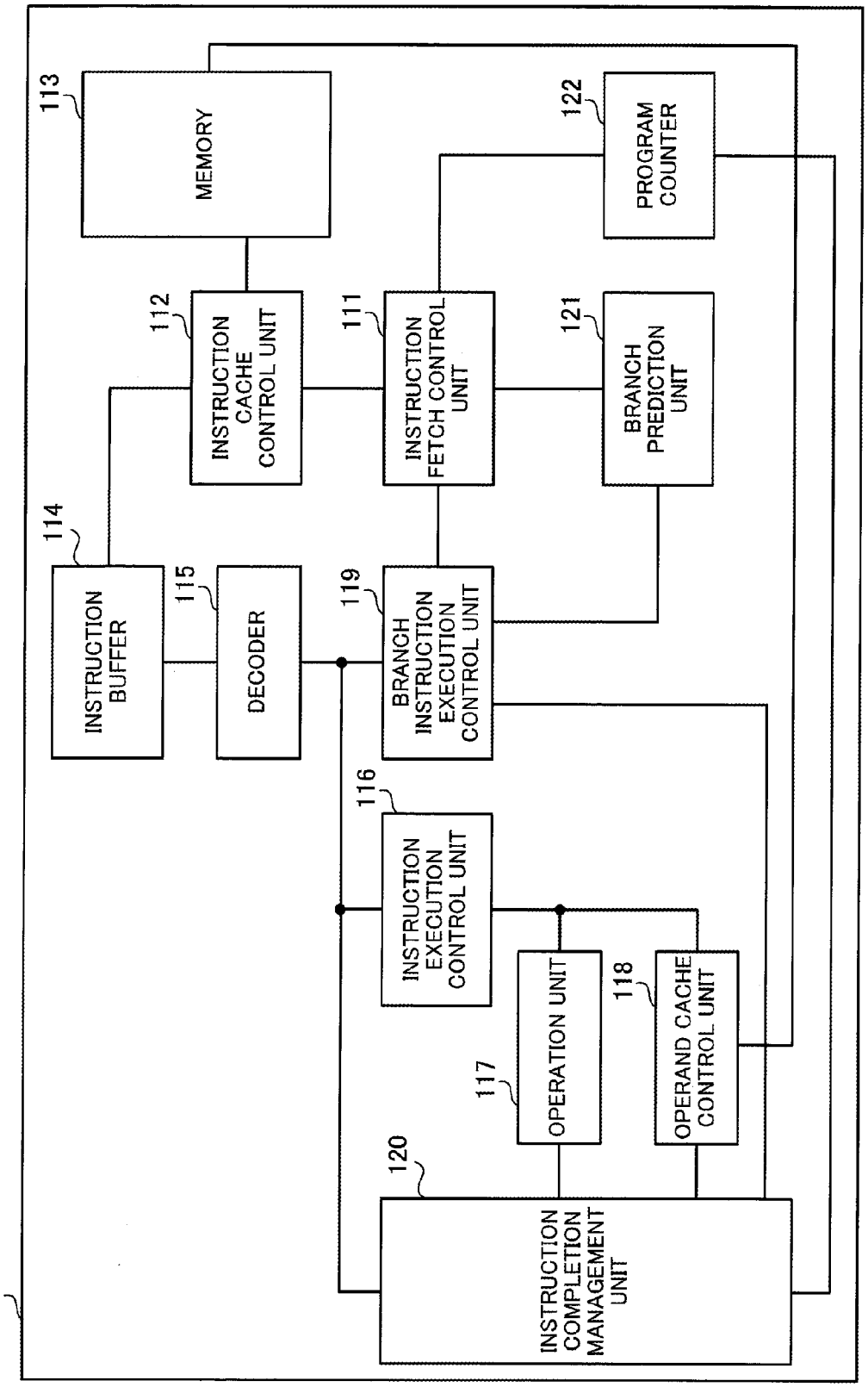
FIG. 2 illustrates an example of an entire configuration of an arithmetic processing apparatus according to a second embodiment.

FIG. 2 illustrates an example of an entire configuration of an arithmetic processing apparatus according to a second embodiment.

An arithmetic processing apparatus 100 illustrated in FIG. 2 includes an instruction fetch control unit 111, instruction cache control unit 112, memory 113, instruction buffer 114, decoder 115, instruction execution control unit 116, operation unit 117, operand cache control unit 118, branch instruction execution control unit 119, instruction completion management unit 120, branch prediction unit 121, and program counter 122.

The instruction fetch control unit 111 outputs an address to be fetched next, to the instruction cache control unit 112 to request an instruction fetch. The instruction fetch control unit 111 determines the address of an instruction to be fetched, based on the count value of the program counter 122, a predicted branch target address received from the branch prediction unit 121, an instruction re-fetch request received from the branch instruction execution control unit 119, and others. The instruction fetch control unit 111 also notifies the branch instruction execution control unit 119 of branch prediction information that is output from the branch prediction unit 121 and includes a predicted branch target address and others.

The instruction cache control unit 112 includes a local instruction cache (not illustrated) for caching instructions that are stored in the memory 113. The instruction cache control unit 112 reads, from the instruction cache, an instruction based on an address output from the instruction fetch control unit 111, and stores the read instruction in the instruction buffer 114.

The decoder 115 reads an instruction from the instruction buffer 114, and decodes the instruction. If the decoded instruction is a branch instruction, the decoder 115 outputs the decoded instruction to the branch instruction execution control unit 119. If the decoded instruction is not a branch instruction, the decoder 115 outputs the decoded instruction to the instruction execution control unit 116. In addition, the decoder 115 outputs the decoded instruction to the instruction completion management unit 120 irrespective of the type of the decoded instruction.

The instruction execution control unit 116 is provided with a reservation station, for example, and outputs an instruction received from the decoder 115 to the operation unit 117 or operand cache control unit 118 to execute the instruction. In this connection, the reservation station is designed to queue instructions decoded by the decoder 115 and exercise control so as to sequentially output instructions that are ready to be executed, to the operation unit 117 or operand cache control unit 118.

The operation unit 117 is provided with a general purpose operation unit, for example, and performs operations according to instructions received from the instruction execution control unit 116. After performing an operation, the operation unit 117 writes the operation result in a register, not illustrated, or the like, and reports the execution completion of the instruction to the instruction completion management unit 120.

The operand cache control unit 118 is provided with a local operand cache for caching data that is stored in the memory 113. For example, the operand cache control unit 118 generates an operand address in response to a load instruction received from the instruction execution control unit 116, and reads the data from the generated operand address in the operand cache. After reading the data from the operand cache, the operand cache control unit 118 reports the execution completion of the instruction to the instruction completion management unit 120.

The branch instruction execution control unit 119 is provided with, for example, a local branch reservation station so as to manage execution of branch instructions decoded by the decoder 115 by registering the branch instructions in the branch reservation station. The branch instruction execution control unit 119 determines whether a branch prediction is correct or not, by comparing branch prediction information received from the instruction fetch control unit 111 with a result of executing a branch instruction received from the decoder 115. In addition, after completing the execution of the branch instruction and judging whether the branch prediction is correct or not, the branch instruction execution control unit 119 reports the execution completion of the instruction to the instruction completion management unit 120, and also outputs, to the branch prediction unit 121, information indicating whether the branch prediction is correct or not, each address of the branch instruction and branch target instruction, and others.

The instruction completion management unit 120 manages the execution states of instructions decoded by the decoder 115. For example, the instruction completion management unit 120 completes, in-order, instructions that were executed out-of-order by the instruction execution control unit 116 or branch instruction execution control unit 119. The instruction completion management unit 120 increments the count value of the program counter 122 each time an instruction completes its execution.

The branch prediction unit 121 is provided with a branch prediction table which registers therein the address of a branch instruction and a predicted branch target address in association with each other. The branch prediction unit 121 receives the address of an instruction to be fetched next from the instruction fetch control unit 111, and searches the branch prediction table using the received address. If an instruction to be fetched next is a branch instruction, the branch prediction unit 121 obtains branch prediction information including the predicted branch target address from the branch prediction table, as a search result, and outputs the obtained branch prediction information to the instruction fetch control unit 111. In addition, the branch prediction unit 121 predicts a branch target of a branch instruction based on information received from the branch instruction execution control unit 119 that indicates whether a branch prediction is correct or not, each address of the branch instruction and its branch target instruction, and others, and updates the branch prediction table according to the prediction result.

The program counter 122 increments the count value according to a request from the instruction completion management unit 120. The program counter 122 also updates the count value according to a branch target address from the branch instruction execution control unit 119.

Figure 3:
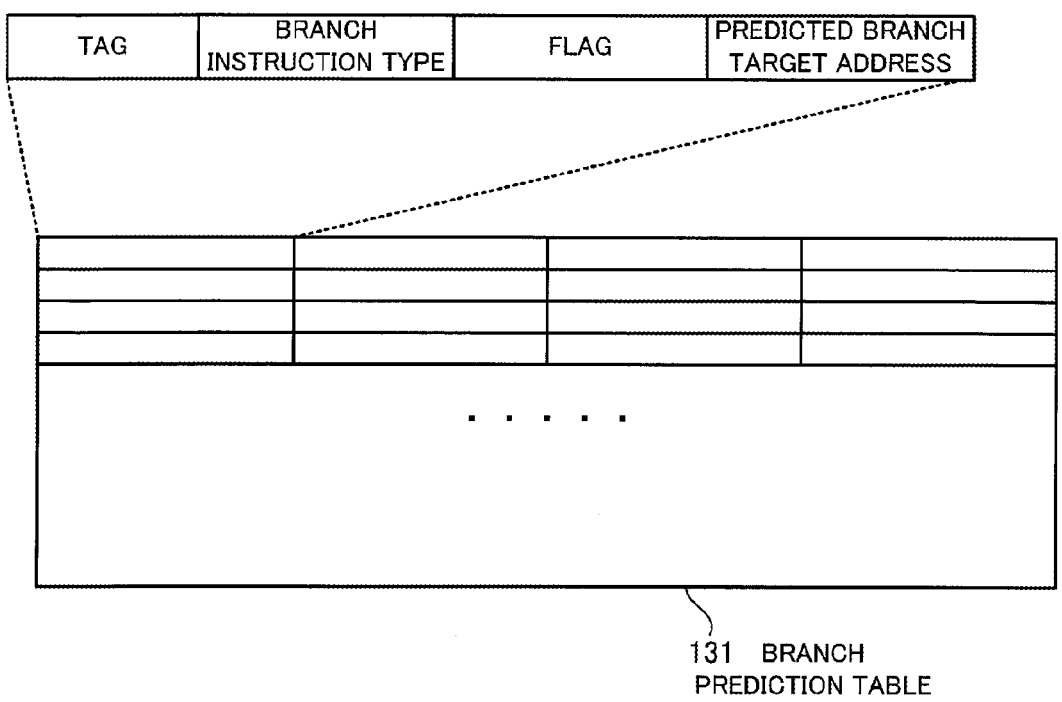
FIG. 3 illustrates an example of a data structure of a branch prediction table provided in a branch prediction unit.

The following describes a branch prediction unit. FIG. 3 illustrates an example of a data structure of a branch prediction table provided in a branch prediction unit.

A branch prediction table 131 provided in the branch prediction unit 121 is a set associative storage device, for example, and includes a plurality of ways. In each way of the branch prediction table 131, the address of a branch instruction (or a part of the address) is registered as a tag, and in association with the address of each branch instruction, a branch instruction type indicating the type of the branch instruction, a flag indicating predetermined information on the branch instruction, other than the type, and a predicted branch target address are registered.

Figure 4:
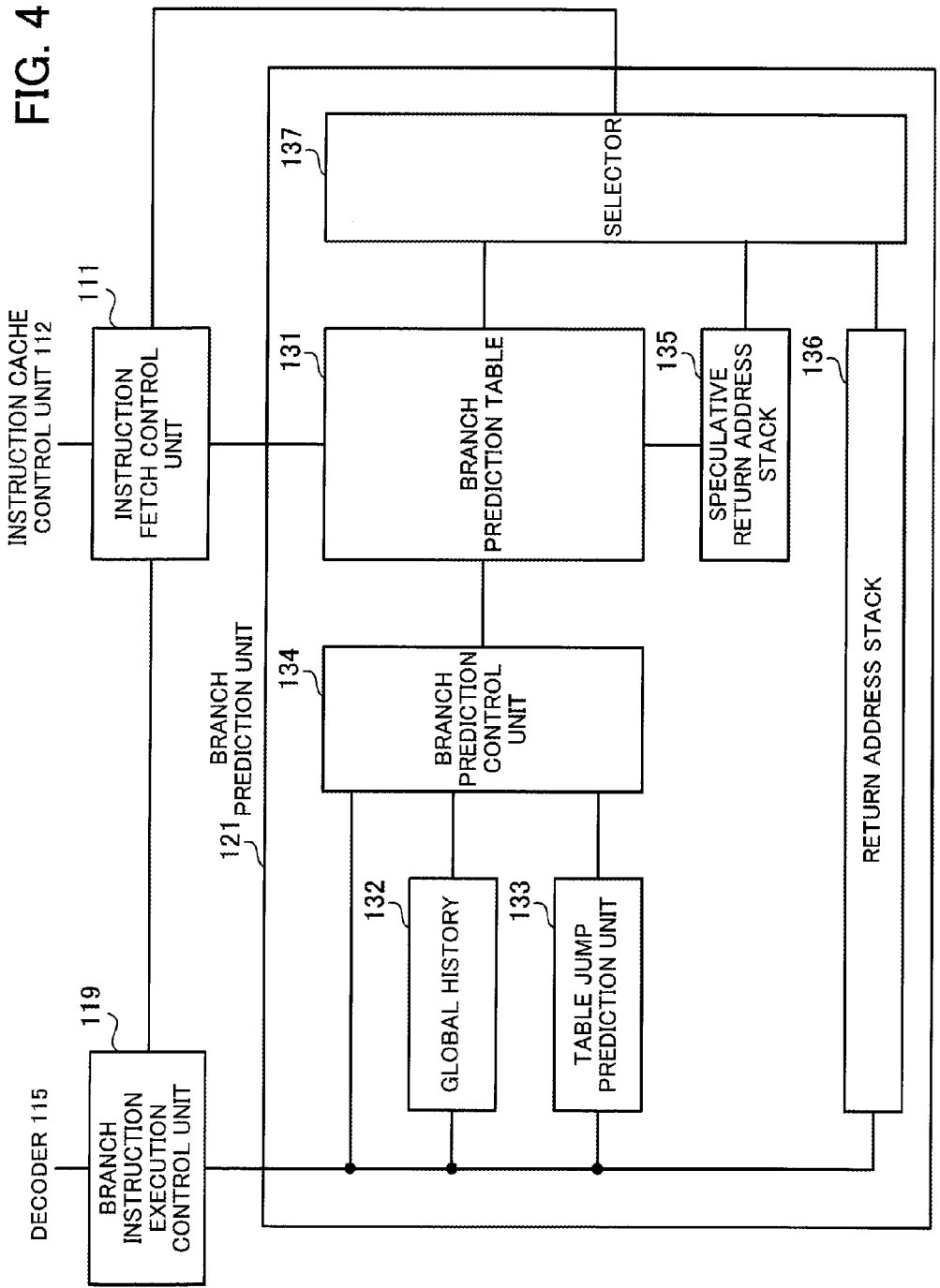
FIG. 4 illustrates an example of an internal configuration of a branch prediction unit.

FIG. 4 illustrates an example of an internal configuration of a branch prediction unit. In this connection, FIG. 4 illustrates the instruction fetch control unit 111 and branch instruction execution control unit 119 in addition to the branch prediction unit 121. The operation of the branch prediction unit 121 will be described together with the operations of the instruction fetch control unit 111 and branch instruction execution control unit 119.

The branch prediction unit 121 includes a branch prediction table 131, global history 132, table jump prediction unit 133, branch prediction control unit 134, speculative return address stack 135, return address stack 136, and selector 137.

As illustrated in FIG. 3, the branch prediction table 131 stores the address of a branch instruction and a predicted branch target address in association with each other. A process of registration to the branch prediction table 131 is performed by the branch prediction control unit 134.

When outputting the address of an instruction to be fetched, to the instruction cache control unit 112, the instruction fetch control unit 111 also outputs the same address to the branch prediction table 131 to search the branch prediction table 131. If a way where the address output from the instruction fetch control unit 111 is registered as a tag exists in the branch prediction table 131, the information stored in the found way and the way number of the found way are output as branch prediction information to the instruction fetch control unit 111 via the selector 137.

If the address of the branch instruction registered in the way found from the branch prediction table 131 indicates a subroutine call instruction, the found branch instruction address is output from the branch prediction table 131 to the speculative return address stack 135, and the speculative return address stack 135 stores therein a predicted branch target address corresponding to the branch instruction address received from the branch prediction table 131. If the address of the branch instruction registered in the way found from the branch prediction table 131 indicates a subroutine return instruction, a predicted branch target address obtained from the speculative return address stack 135 or return address stack 136 is output to the instruction fetch control unit 111 via the selector 137, as will be described later.

When receiving branch prediction information from the selector 137, the instruction fetch control unit 111 outputs the predicted branch target address included in the received branch prediction information to the instruction cache control unit 112 to request an instruction fetch. In addition, the instruction fetch control unit 111 outputs the branch prediction information received from the selector 137 to the branch instruction execution control unit 119.

The branch instruction execution control unit 119 compares the branch prediction information received from the instruction fetch control unit 111 with a result of executing the branch instruction received from the decoder 115, to determine whether the branch prediction is correct or not. If the branch prediction is wrong, the branch instruction execution control unit 119 causes an instruction execution unit, not illustrated, to cancel speculative execution of the branch target instruction, and informs the instruction fetch control unit 111 of the correct branch target address to request the re-fetching of the branch target instruction.

In addition, when completing the execution of a branch instruction and determining whether the branch prediction is correct or not, the branch instruction execution control unit 119 reports the execution completion of the instruction to the instruction completion management unit 120. At the same time, the branch instruction execution control unit 119 outputs the execution result of the branch instruction to the branch prediction unit 121. This execution result of the branch instruction includes an execution completion signal, the address of the executed branch instruction, the type information of the executed branch instruction, the address of a branch target instruction, information indicating whether the branch prediction is correct or not, the way number of a way where the predicted branch target address is to be registered in the branch prediction table 131, and others.

The global history 132 takes in the execution results of conditional branch instructions out of the execution results of branch instructions output from the branch instruction execution control unit 119, and operates. The global history 132 stores, based on the acquired execution results of branch instructions, a history of taken and not-taken branches determined by executing the conditional branch instructions, and outputs a predicted branch target address with reference to the stored history.

For example, the global history 132 stores the number of consecutive taken branches and the number of consecutive not-taken branches, which occurred in the past, on the basis of the acquired execution results of branch instructions. If the current number of consecutive taken branches reaches a predetermined value, the global history 132 predicts that a branch will be not taken next time. If the current number of consecutive not-taken branches reaches a predetermined value, the global history 132 predicts that a branch will be taken next time. When predicting that a branch will be taken next time, the global history 132 outputs a branch target address corresponding to the executed branch instruction as a predicted branch target address to the branch prediction control unit 134 to register the predicted branch target address in the branch prediction table 131.

The table jump prediction unit 133 takes in the execution results of branch instructions having a plurality of branch targets, except subroutine return instructions, out of the execution results of branch instructions output from the branch instruction execution control unit 119, and operates. The instructions to be taken in by the table jump prediction unit 133 include, as a representative example, an instruction called "table jump" that is represented as a switch/case statement in C language. In the following description, an instruction that is taken in by the table jump prediction unit 133 is referred to as a "table jump instruction".

The table jump prediction unit 133 includes a table that is capable of storing a history of the addresses of a plurality of branch targets that were executed with respect to each address of one or more table jump instructions, as will be described later. The table jump prediction unit 133 determines a predicted branch target address corresponding to a table jump instruction with reference to the local table, and outputs the determined predicted branch target address to the branch prediction control unit 134 to register the predicted branch target address in the branch prediction table 131.

FIG. 5 illustrates an example of a program for executing a table jump instruction. The example of the program illustrated in FIG. 5 is described using a switch/case statement in C language.

When the program illustrated in FIG. 5 starts, a different process is performed depending on the value of a conditional statement a. When the value of the conditional statement a is a1, a process Pa is performed. When the value of the conditional statement a is a2, a process Pb is performed. When the value of the conditional statement a is not a1 or a2, a process Pc is performed. That is to say, when executing the instruction in accordance with the program illustrated in FIG. 5, the arithmetic processing apparatus 100 executes the instruction of a different branch target depending on the value of the conditional statement a.

The description now refers back to FIG. 4.

When a branch instruction completes its execution and the execution result of the branch instruction is output from the branch instruction execution control unit 119, the branch prediction control unit 134 registers a predicted branch target address in the branch prediction table 131. When a conditional branch instruction completes its execution, the branch prediction control unit 134 registers a predicted branch target address output from the global history 132 in the branch prediction table 131. When a table jump instruction completes its execution, the branch prediction control unit 134 registers a predicted branch target address output from the table jump prediction unit 133 in the branch prediction table 131. When no predicted branch target address is output from the global history 132 or table jump prediction unit 133, like the case where a subroutine call instruction or subroutine return instruction completes its execution, the branch prediction control unit 134 registers the branch target address included in the execution result of the branch instruction output from the branch instruction execution control unit 119, as a predicted branch target address in the branch prediction table 131.

The branch prediction control unit 134 registers, together with a predicted branch target address, the address of a branch instruction, type information, and various flags corresponding to the predicted branch target address, in the same way of the branch prediction table 131. The branch prediction control unit 134 obtains the address of the branch instruction, type information, and various flags to be registered in the branch prediction table 131, from the execution result of the branch instruction output from the branch instruction execution control unit 119.

In addition, if a way corresponding to the executed branch instruction already exists in the branch prediction table 131, the branch prediction control unit 134 updates the information stored in the way, except a tag, with new information. In this case, the branch prediction control unit 134 registers the information in the way identified by the way number included in the execution result of the branch instruction received from the branch instruction execution control unit 119, out of the ways of the branch prediction table 131. If a way corresponding to the executed branch instruction does not exist in the branch prediction table 131, the branch prediction control unit 134 registers information including a tag in a free way of the branch prediction table 131. If there is no free way in the branch prediction table 131, the branch prediction control unit 134 selects a way through, for example, the LRU (Least Recently Used) or its equivalent policy, and registers the information including the tag in the selected way. Alternatively, the branch prediction control unit 134 may specify a way for registering the predicted branch target address in the branch prediction table 131 with reference to, for example, a correspondence table between a branch instruction address and a way of the branch prediction table 131.

The speculative return address stack 135 speculatively predicts a return destination address for a subroutine return instruction before a subroutine call instruction corresponding to this subroutine return instruction is executed. As described earlier, if a branch instruction address registered in a way found from the branch prediction table 131 is the address of a subroutine call instruction, the speculative return address stack 135 obtains the found branch instruction address from the branch prediction table 131. The speculative return address stack 135 then translates the address of the found subroutine call instruction into the address of a subroutine return instruction corresponding to the subroutine call instruction, and holds this result in the stack. For example, the speculative return address stack 135 calculates the address of the subroutine return instruction corresponding to the subroutine call instruction by adding a predetermined value to the address of the subroutine call instruction. The speculative return address stack 135 outputs the address held in the stack, as a predicted return destination address (that is, predicted branch target address) for the subroutine return instruction.

The return address stack 136 stores the return destination address of the subroutine return instruction corresponding to a subroutine call instruction that has completed its execution, based on a branch instruction execution result received from the branch instruction execution control unit 119. The return address stack 136 translates the address of the completed subroutine call instruction into the address of the subroutine return instruction corresponding to this subroutine call instruction, and holds this result in the stack. For example, the return address stack 136 calculates the address of the subroutine return instruction corresponding to the subroutine call instruction by adding a predetermined value to the address of the subroutine call instruction. The return address stack 136 outputs the address held in the stack, as a predicted return destination address (that is, predicted branch target address) for the subroutine return instruction.

When a request for searching the branch prediction table 131 is made by the instruction fetch control unit 111, the selector 137 outputs branch prediction information based on a way found from the branch prediction table 131, to the instruction fetch control unit 111. This branch prediction information includes a predicted branch target address. In this connection, when the request is for searching the branch prediction table 131 for a subroutine return instruction, the selector 137 obtains a predicted branch target address from the speculative return address stack 135 or return address stack 136, whichever holds a valid predicted branch target address, and outputs the predicted branch target address to the instruction fetch control unit 111.

Figure 6:
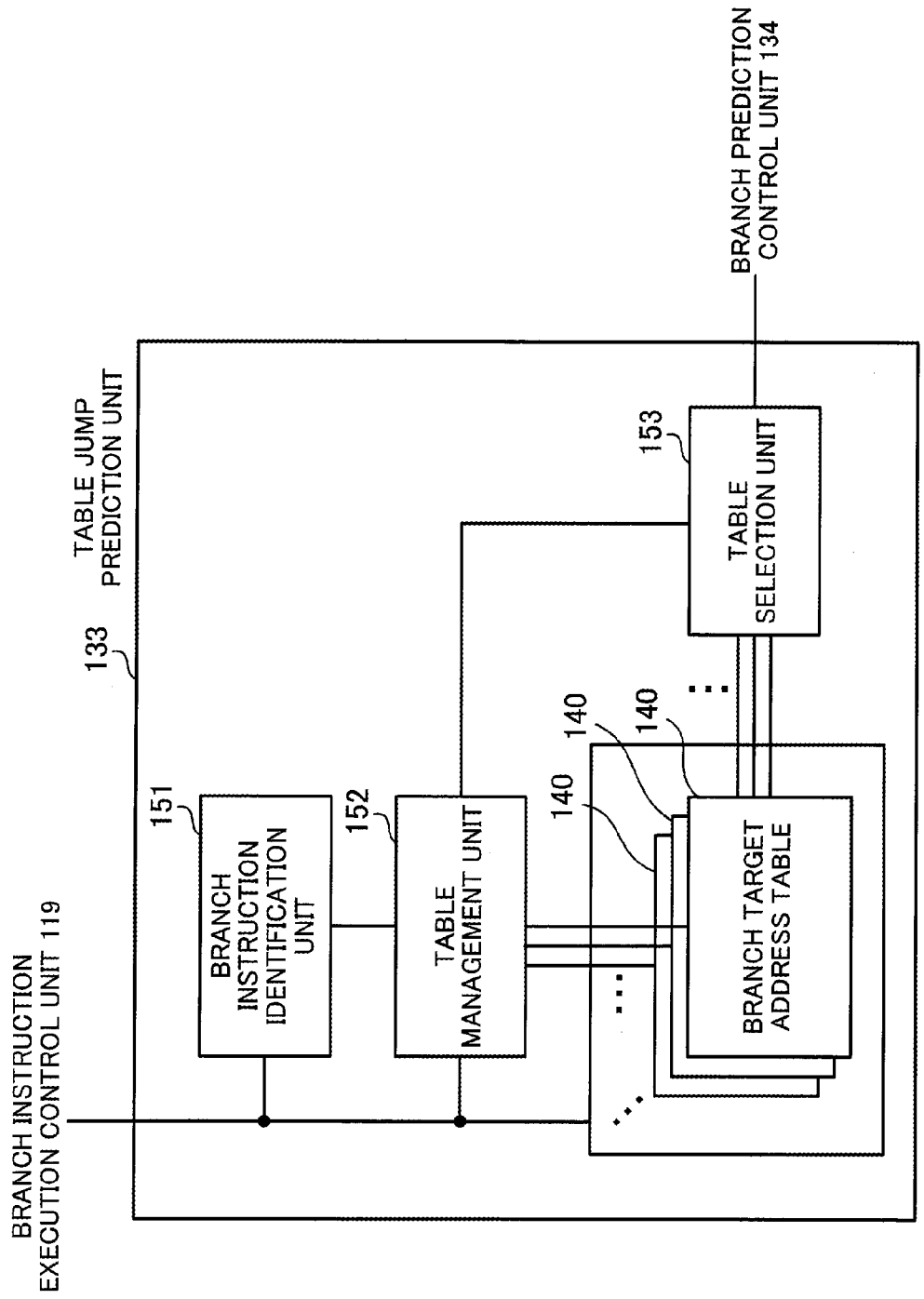
FIG. 6 illustrates an example of an internal configuration of a table jump prediction unit.

The following describes a process performed by the table jump prediction unit 133. FIG. 6 illustrates an example of an internal configuration of a table jump prediction unit.

The table jump prediction unit 133 includes a plurality of branch target address tables 140. The branch target address tables 140 are prepared for respective branch instructions, and each branch target address table 140 stores the address of one branch instruction, and a plurality of branch target addresses determined by executing the branch instruction.

The table jump prediction unit 133 also includes a branch instruction identification unit 151, table management unit 152, and table selection unit 153.

When a branch instruction completes its execution, the branch instruction identification unit 151 determines based on the type information included in the execution result of the branch instruction output from the branch instruction execution control unit 119 whether the branch instruction execution result is a result of executing a table jump instruction or not. If the branch instruction execution result is a result of executing a table jump instruction, the branch instruction identification unit 151 causes the table management unit 152 to start to operate.

The table management unit 152 performs processes such as generating or searching the branch target address tables 140, determining a predicted branch target address, etc. The table management unit 152 selects a branch target address table 140 where the address of a table jump instruction that has completed its execution is registered. If there is no branch target address table 140 where the address of the completed table jump instruction is registered, the table management unit 152 generates a new branch target address table 140 for registering the address of the completed table jump instruction. The table management unit 152 outputs a table selection signal to the table selection unit 153 to cause the table selection unit 153 to select an output of the selected or new branch target address table 140.

The table management unit 152 registers the branch target address included in a branch instruction execution result, in the selected or new branch target address table 140. At the same time, the table management unit 152 selects an entry storing a branch target address that is to be a predicted branch target address, from the entries of the branch target address table 140, and outputs an entry selection signal for instructing an output of the predicted branch target address from the selected entry.

The table selection unit 153 selects one of the branch target address tables 140 in accordance with the table selection signal received from the table management unit 152. The table selection unit 153 outputs the predicted branch target address output from the selected branch target address table 140 to the branch prediction table 131 via the branch prediction control unit 134.

Figure 7:
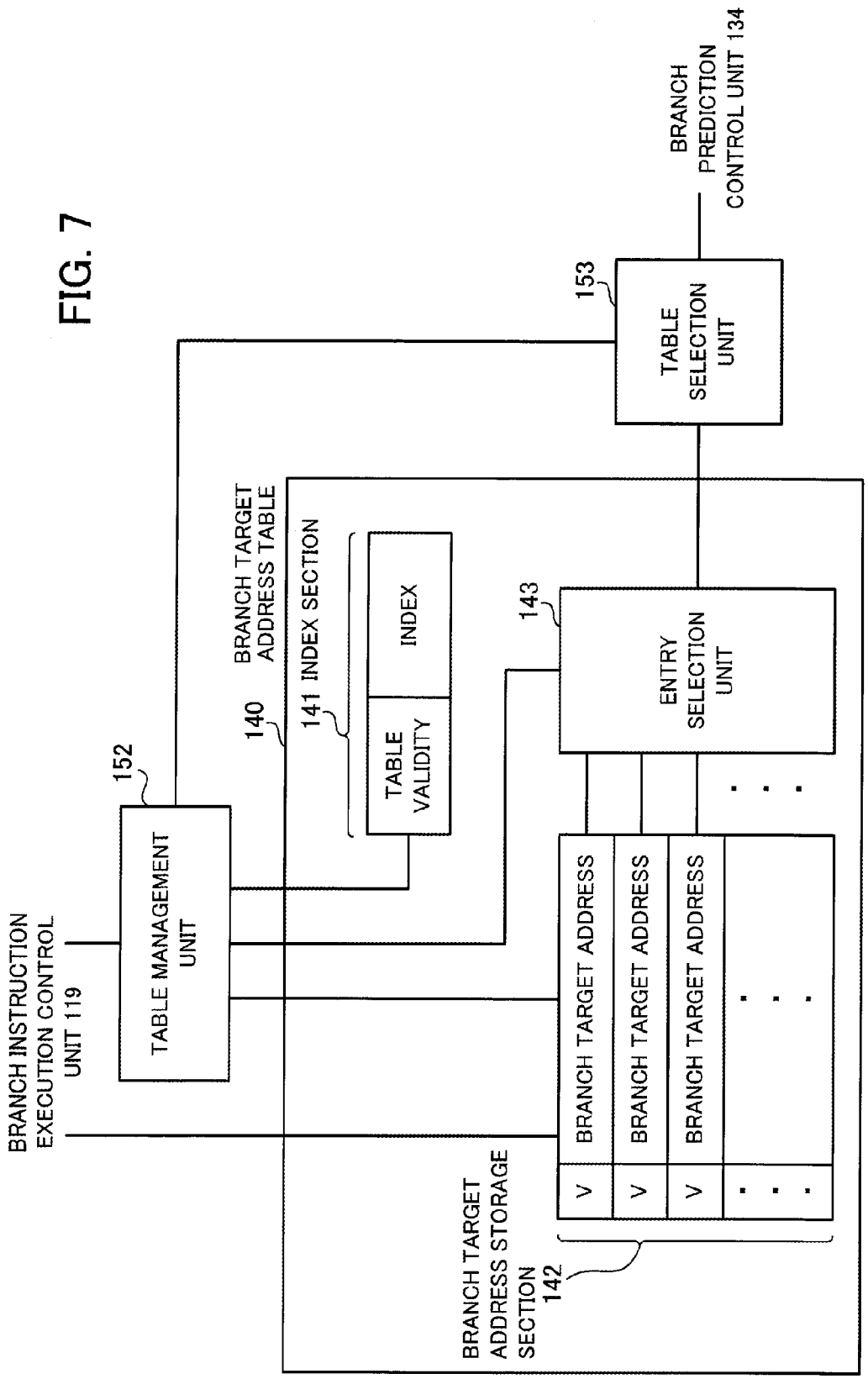
FIG. 7 illustrates an example of a configuration of a branch target address table according to the second embodiment.

FIG. 7 illustrates an example of a configuration of a branch target address table according to the second embodiment. Note that FIG. 7 also illustrates the table management unit 152 and table selection unit 153 for use in the explanation.

Each branch target address table 140 includes an index section 141 and branch target address storage section 142 as areas for storing information.

The index section 141 stores a table validity and an index. The table validity is a flag indicating whether the branch target address table 140 is valid or not (that is, whether the address of a branch instruction and at least one branch target address are registered in the branch target address table 140 or not). A table validity with a value of "1" means that the branch target address table 140 is valid, whereas a table validity with a value of "0" means that the branch target address table 140 is invalid. An index is used to partially or wholly register the address of a branch instruction. The value in the index indicates which table jump instruction the branch target address table 140 corresponds to.

The branch target address storage section 142 includes a plurality of entries each including a validity flag ("V" in FIG. 7) and a branch target address. Under the control of the table management unit 152, branch target addresses are registered in entries in order from the first entry in the branch target address storage section 142, and the validity flag in an entry where a branch target address is registered is set to "1".

In addition, each branch target address table 140 includes an entry selection unit 143 that selects one entry from the branch target address table 140 according to an entry selection signal received from the table management unit 152, and outputs the predicted branch target address output from the selected entry, to the table selection unit 153.

Figure 8:
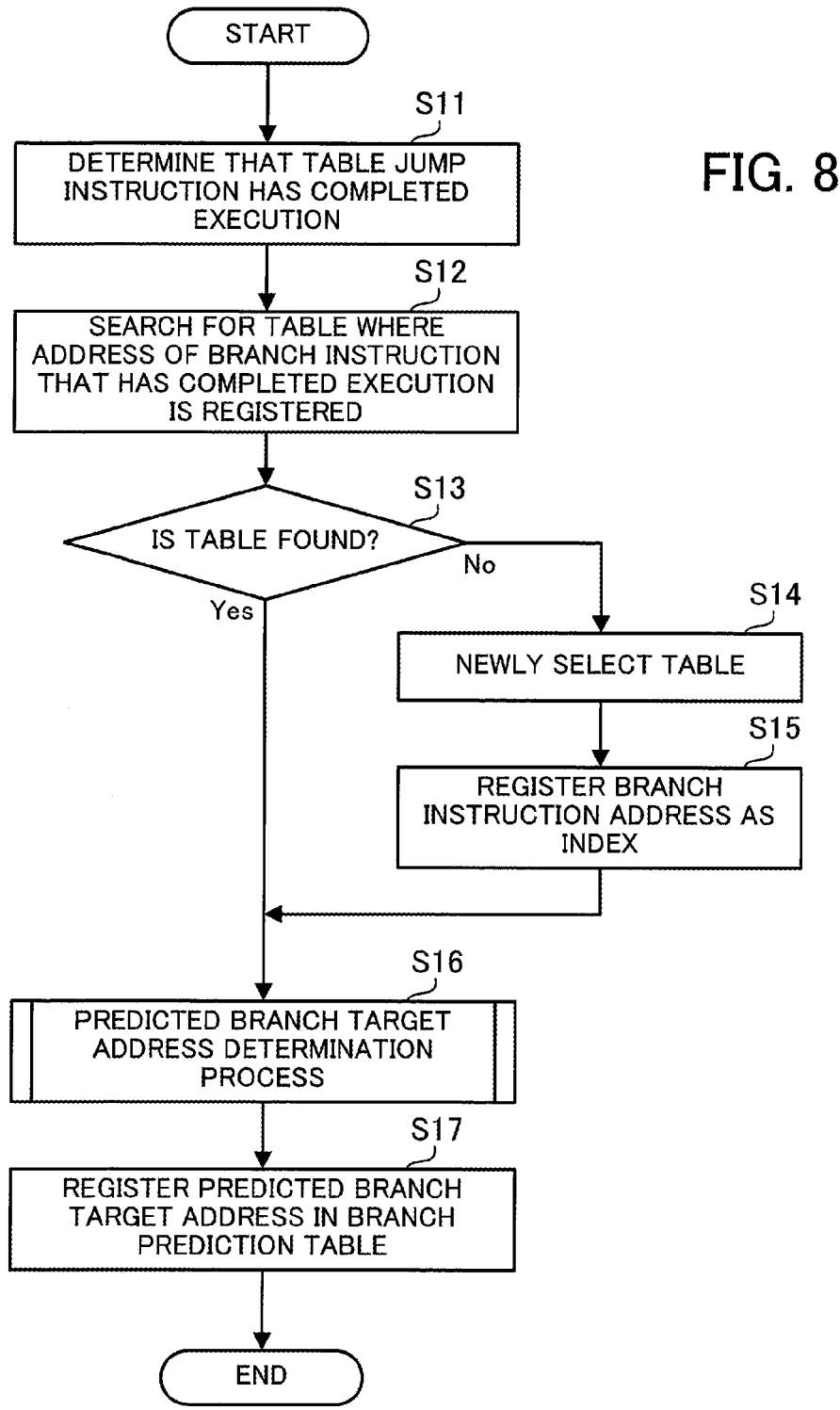
FIG. 8 is a flowchart illustrating how to predict a branch target of a table jump instruction according to the second embodiment.

FIG. 8 is a flowchart illustrating how to predict a branch target of a table jump instruction according to the second embodiment.

(Step S11) When a branch instruction completes its execution, an execution completion signal included in the execution result of the branch instruction output from the branch instruction execution control unit 119 is changed to indicating ON, and the other signals included in the branch instruction execution result from the branch instruction execution control unit 119 become valid.

When detecting that the execution completion signal has been changed to "1", the branch instruction identification unit 151 determines based on the type information included in the branch instruction execution result received from the branch instruction execution control unit 119 whether the completed instruction is a table jump instruction or not. When determining that the completed instruction is a table jump instruction, the branch instruction identification unit 151 outputs an enable signal to the table management unit 152, for example, and then step S12 and subsequent steps are executed.

(Step S12) The table management unit 152 refers to the index section 141 in each of a plurality of branch target address tables 140 included in the table jump prediction unit 133. The table management unit 152 then searches the plurality of branch target address tables 140 for a table where the branch instruction address included in the branch instruction execution result received from the branch instruction execution control unit 119 is registered as an index. This step S12 is executed to search for such a branch target address table 140 that the branch instruction address included in the branch instruction execution result is registered as an index and a table validity is "1".

(Step S13) If the searching of step S12 results in detecting a branch target address table 140 where the branch instruction address included in the branch instruction execution result is registered (yes in S13), the table management unit 152 selects the branch target address table 140 for further processing, and proceeds to step S16. If the searching of step S12 results in detecting no such branch target address table 140 that the branch instruction address included in the branch instruction execution result is registered (no in S13), on the other hand, the table management unit 152 proceeds to step S14.

(Step S14) The table management unit 152 newly selects, for further processing, a branch target address table 140 that has a table validity of "0" indicating invalidity in an index section 141. At this time, the table management unit 152 updates the table validity in the selected branch target address table 140 to "1".

In this connection, for example, the table management unit 152 manages the branch target address tables 140, for example, using a round-robin counter as follows. Assuming that there are N branch target address tables 140 (N is an integer of one or greater), the round-robin counter has an initial count value of "0", and the upper limit of the count value is "N−1". In step S14, the table management unit 152 selects, for further processing, a branch target address table 140 corresponding to the current count value of the round-robin counter. At this time, the table management unit 152 updates the table validity to in the selected branch target address table 140, and increments the count value of the round-robin counter by "1".

(Step S15) The table management unit 152 registers the branch instruction address included in the branch instruction execution result received from the branch instruction execution control unit 119 as an index in the branch target address table 140 selected in step S14. Then, step S16 is executed.

(Step S16) The table management unit 152 determines a predicted branch target address based on the information registered in the branch target address table 140 selected for further processing. In this step S16, the table management unit 152 causes the entry selection unit 143 to select one of the entries in the branch target address storage section 142, and output the address registered in the selected entry, as a predicted branch target address to the table selection unit 153. This process in step S16 will be described in detail with reference to FIG. 9.

(Step S17) The table management unit 152 outputs a selection signal to the table selection unit 153 so as to select an output of the entry selection unit 143 in the branch target address table 140 selected for further processing. In this connection, the selection signal itself may be output at any timing after the branch target address table 140 where the branch instruction address is registered is confirmed in step S13 or the branch target address table 140 is newly selected in step S14 until step S17 is executed.

The predicted branch target address output from the entry selection unit 143 is output to the branch prediction control unit 134 via the table selection unit 153. The branch prediction control unit 134 registers the predicted branch target address output from the table selection unit 153, together with a branch instruction address, branch instruction type, and various flags corresponding to the predicted branch target address in the branch prediction table 131. At this time, the branch prediction control unit 134 obtains the branch instruction address, branch instruction type, and various flags to be registered in the branch prediction table 131, from the branch instruction execution result output from the branch instruction execution control unit 119. In this connection, if there is already a way corresponding to the executed branch instruction in the branch prediction table 131, the branch prediction control unit 134 overwrites the predicted branch target address, branch instruction type, and various flags in the way of the branch prediction table 131 identified by the way number included in the branch instruction execution result output from the branch instruction execution control unit 119.

Figure 9:
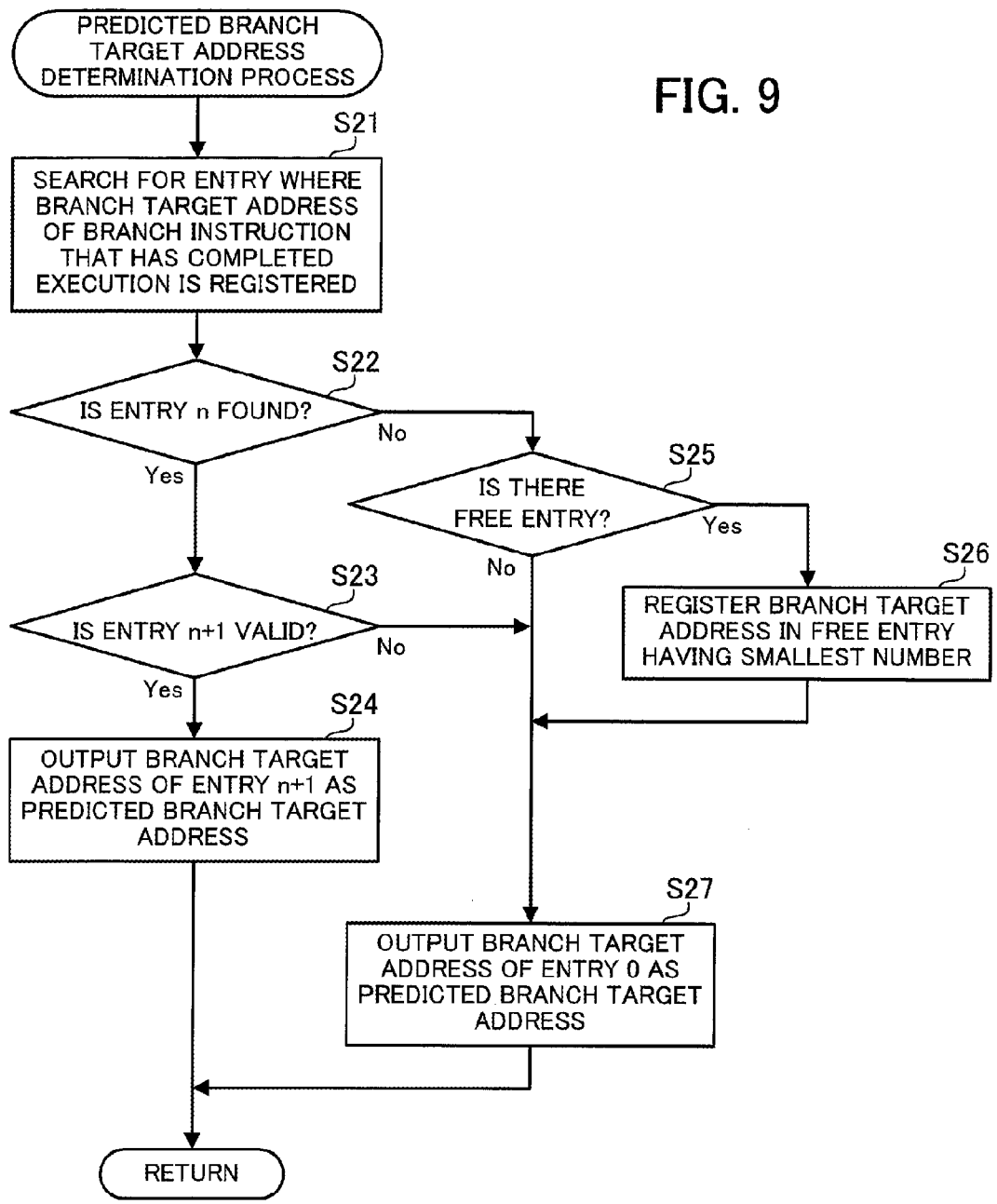
FIG. 9 is a flowchart illustrating how to determine a predicted branch target address according to the second embodiment.

FIG. 9 is a flowchart illustrating how to determine a predicted branch target address according to the second embodiment. The process illustrated in FIG. 9 corresponds to step S16 of FIG. 8.

(Step S21) The table management unit 152 searches the branch target address storage section 142 of a branch target address table 140 selected for further processing, for an entry where the branch target address of a branch instruction that has completed its execution (that is, the branch target address included in a branch instruction execution result output from the branch instruction execution control unit 119) is registered.

(Step S22) If detecting, as a result of the searching of step S21, an entry n (n is an integer whose initial value is "0") as an entry where the branch target address included in the branch instruction execution result is registered (yes in S22), the table management unit 152 executes step S23. If there is no entry where the branch target address included in the branch instruction execution result is registered (no in S22), on the other hand, the table management unit 152 executes step S25.

(Step S23) The table management unit 152 determines whether the entry (entry (n+1)) next to the entry detected in step S22 out of the entries of the branch target address storage section 142 is valid or not. In the case where a validity flag is "1" and a branch target address is registered in the entry (n+1), the entry (n+1) is determined valid (yes in S23). In this case, the table management unit 152 executes step S24. On the other hand, in the case where the validity flag in the entry (n+1) is "0" or there is no entry (n+1) because the entry n is the last entry of the branch target address storage section 142, then the entry (n+1) is determined invalid (no in S23). If the entry (n+1) is invalid, the table management unit 152 executes step S27.

(Step S24) The table management unit 152 outputs a selection signal to the entry selection unit 143 to select an output from the entry (entry (n+1)) next to the entry detected in step S22. Thereby the branch target address registered in the entry (n+1) is output to the table selection unit 153 via the entry selection unit 143 as a predicted branch target address.

(Step S25) When there is no entry where the branch target address included in the branch instruction execution result is registered, in the branch target address storage section 142 (no in S22), the table management unit 152 determines whether there is a free entry having a validity flag of "0" in the branch target address storage section 142. If there is such a free entry (yes in S25), the table management unit 152 executes step S26. If there is no such free entry (no in S25), the table management unit 152 executes step S27.

(Step S26) The table management unit 152 updates the validity flag of an entry having the smallest number to "1", out of the free entries of the branch target address storage section 142, and registers the branch target address included in the branch instruction execution result. Then, the table management unit 152 executes step S27.

(Step S27) The table management unit 152 outputs a selection signal to the entry selection unit 143 to select an output from the first entry (entry 0) of the branch target address storage section 142. Thereby, the branch target address registered in the first entry of the branch target address storage section 142 is output as a predicted branch target address to the table selection unit 153 via the entry selection unit 143

According to the process of FIG. 9 as described above, the table management unit 152 searches the branch target address storage section 142 for an entry where an address matching the branch target address obtained by executing a table jump instruction is registered. If the branch target address obtained by executing the table jump instruction is not registered in the branch target address storage section 142, the table management unit 152 registers the branch target address in a free entry having the smallest number in the branch target address storage section 142. In this case, the table management unit 152 determines the branch target address registered in the first entry of the table management unit 152 as a predicted branch target address. On the other hand, if an entry where the branch target address obtained by executing the table jump instruction is registered is found in the branch target address storage section 142, the table management unit 152 does not re-register the branch target address in the branch target address storage section 142. In this case, the table management unit 152 determines the branch target address registered in the valid entry next to the found entry, as a predicted branch target address.

Figure 10:
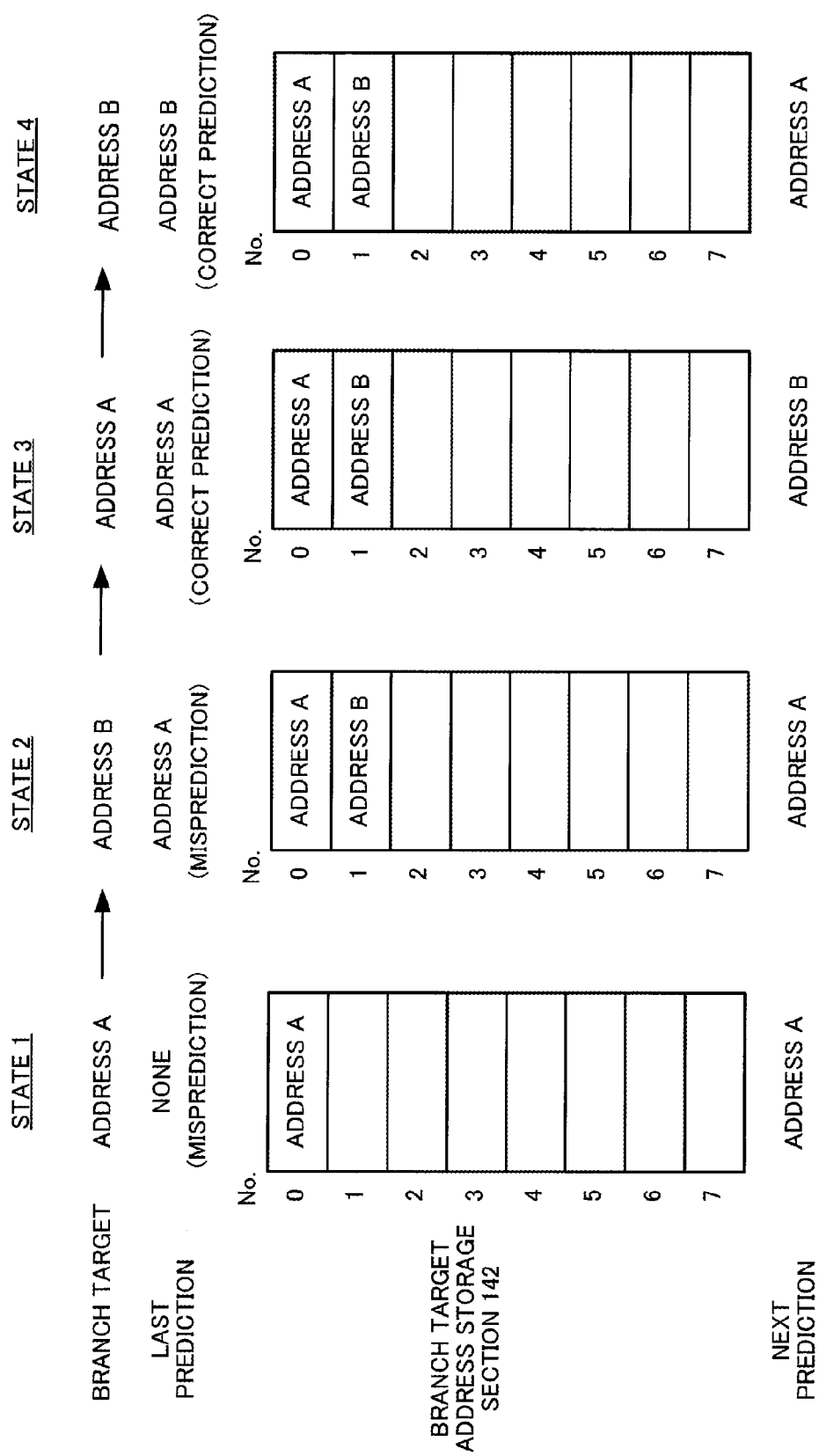
FIG. 10 illustrates a specific example of how to predict a branch target.

The following describes a specific example of how to predict a branch target with reference to the branch target addresses registered in a branch target address table 140, assuming that the program illustrated in FIG. 5 runs. FIG. 10 illustrates a specific example of how to predict a branch target.

In FIG. 10, it is assumed that executions of a table jump instruction result in the addresses of branch target instructions appearing in a recurring pattern of addresses, A, B, A, B, for example. In this connection, the addresses A and B are the addresses of instructions for executing the processes Pa and Pb of FIG. 5, respectively.

In addition, in FIG. 10, a "last prediction" indicates a predicted branch target address that is obtained from the branch prediction table 131 by the instruction fetch control unit 111 at the time of prefetching the table jump instruction corresponding to a branch target address output from the branch instruction execution control unit 119. No match between a branch target address and an address indicated by the "last prediction" means a misprediction. In addition, a "next prediction" indicates a predicted branch address that is registered in the branch prediction table 131 by the table jump prediction unit 133 under the current state, and is an address that is to be indicated by the "last prediction" under the next state.

Assume in FIG. 10 that the execution of a table jump instruction makes a transition from a state where no branch target address is registered in the branch target address storage section 142 to a state 1 where an address A is determined as a branch target. In this state, there is no entry matching the branch target address (no in S22 of FIG. 9), and there are free entries (yes in S25). Therefore, the table management unit 152 registers the address A in the entry 0 of the branch target address storage section 142 (corresponding to S26). The table management unit 152 also outputs the address A registered in the entry 0, as a predicted branch target address (S27).

Then, it is assumed that the execution of the table jump instruction at the same address shifts the state to a state 2 where the address B is determined as a branch target. In this state, there is no entry matching the branch target address (no in S22), and there are free entries (yes in S25). Therefore, the table management unit 152 registers the address B in the entry 1 of the branch target address storage section 142 (corresponding to S26). The table management unit 152 also outputs the address A registered in the entry 0 as a predicted branch target address (S27).

Then, it is assumed that the execution of the table jump instruction at the same address shifts the state to a state 3 where the address A is determined as a branch target. In this state, the predicted branch target address obtained last time matches the actual branch target address, and the prediction is therefore correct. Under this state 3, the entry 0 matches the branch target address (yes in S22), and the entry 1 is valid (yes in S23). Therefore, the table management unit 152 does not register the branch target address, and outputs the address B registered in the entry 1 as a predicted branch target address (S27).

Then, it is assumed that the execution of the table jump instruction at the same address shifts the state to a state 4 where the address B is determined as a branch target. In this state, the predicted branch target address obtained last time matches the actual branch target address, and the prediction is therefore correct. Under this state 4, the entry 1 matches the branch target address (yes in S22), but the entry 2 is invalid (no in S23). Therefore, the table management unit 152 does not register the branch target address, and outputs the address A registered in the entry 0 as a predicted branch target address (S27).

After that, prediction is always to be correct if the addresses A and B alternately appear as branch target addresses.

In the process of FIG. 9, as is seen from the above example of FIG. 10, each time a different branch target address newly appears, the branch target address is registered in a history of branch target addresses that are determined by executing the table jump instruction, in the branch target address storage section 142. Therefore, mutually different branch target addresses are registered in the branch target address storage section 142, and one branch target address is registered in only one entry. In addition, if a branch target address obtained by executing a table jump instruction is registered in the entry n of the branch target address storage section 142 and a different branch target address is registered in the entry (n+1), the branch target address registered in the entry (n+1) is output as a predicted branch target address. The process of FIG. 9 as described above makes it possible to predict a branch target instruction that is to be obtained by executing a table jump instruction, with high accuracy, especially in the case where an appearance pattern of branch target addresses is a pattern having a plurality of different branch target addresses.

In addition, the above-described second embodiment, the table jump prediction unit 133 registers a history of branch target addresses that were determined by executing a table jump instruction in the past, in a branch target address table 140, which is prepared for each address of executed table jump instructions. Then, one predicted branch target address is output from a corresponding branch target address table 140, and is registered together with the address of the table jump instruction in the branch prediction table 131.

According to the technique as described above, the instruction fetch control unit 111 is able to obtain a predicted branch target address with respect to a table jump instruction by searching the branch prediction table 131, as in the case of obtaining a predicted branch target address with respect to a conditional branch instruction. In other words, the branch prediction table 131, which functions as a means of providing a predicted branch target address to the instruction fetch control unit 111, may be used not only for providing a predicted branch target address with respect to a conditional branch instruction but also for providing a predicted branch target address with respect to a table jump instruction. Therefore, there is no need of greatly modifying a circuit configuration and control scheme for the instruction fetch control unit 111 to obtain a predicted branch target address from the branch prediction table 131 while providing the effect of predicting a branch target of a table jump instruction, thus making it possible to suppress an increase in manufacturing and development costs and also in the size of a circuit.

Third Embodiment

Figure 11:
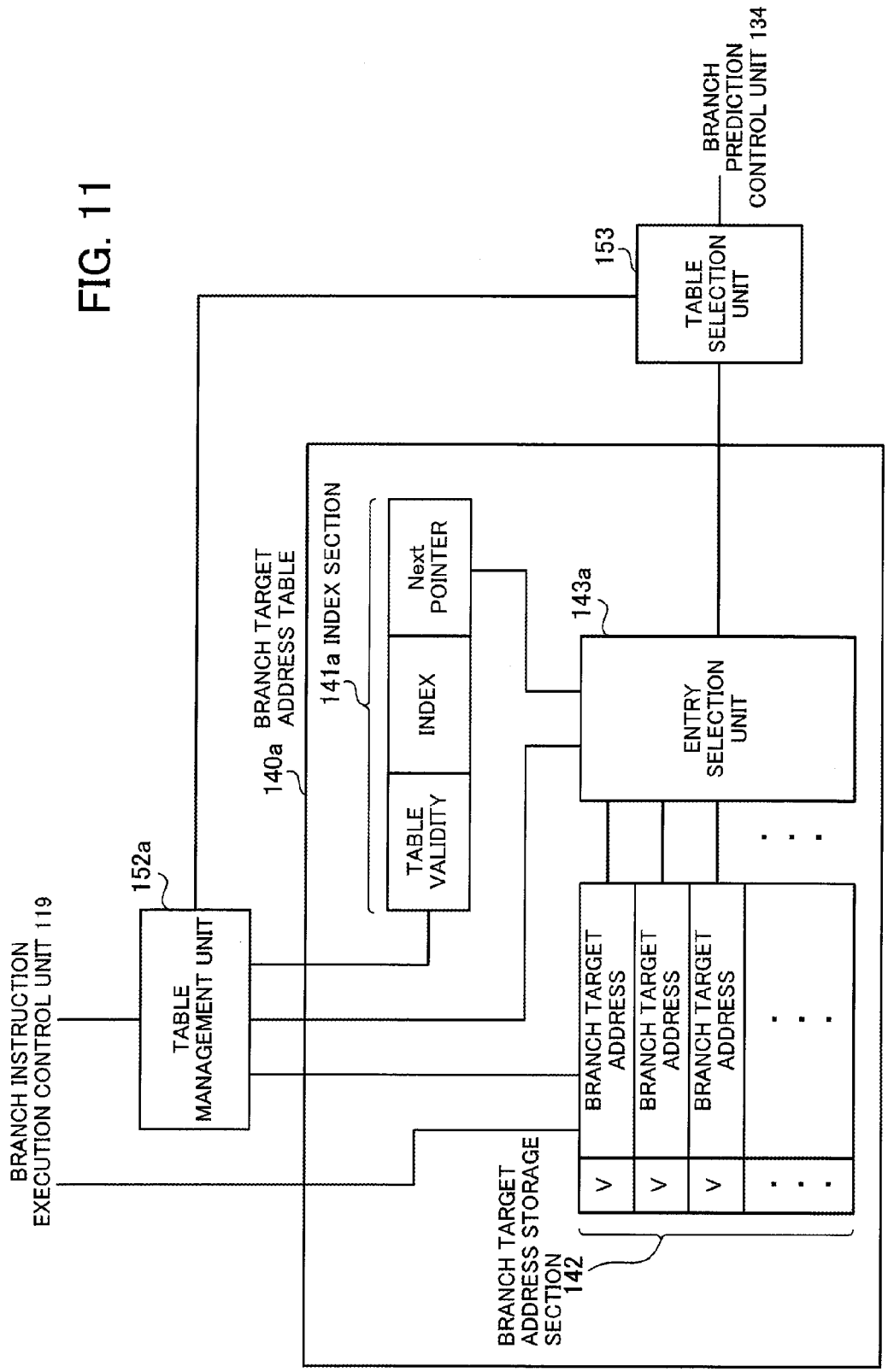
FIG. 11 illustrates an example of a main configuration of an arithmetic processing apparatus according to a third embodiment.

FIG. 11 illustrates an example of a main configuration of an arithmetic processing apparatus according to a third embodiment. In FIG. 11, the same reference numerals are given to constituent elements corresponding to those of FIG. 7.

Compared with the arithmetic processing apparatus according to the second embodiment, the arithmetic processing apparatus according to the third embodiment has a different structure for branch target address tables and a different procedure for a table management unit to predict a prediction target using a branch target address table. More specifically, in place of the branch target address table 140 and table management unit 152 illustrated in FIG. 7, the arithmetic processing apparatus according to the third embodiment is provided with a branch target address table 140a and table management unit 152a as illustrated in FIG. 11. In this connection, similarly to the second embodiment, a plurality of branch target address tables 140a is provided.

Similarly to the branch target address table 140 illustrated in FIG. 7, each branch target address table 140a includes a branch target address storage section 142. The branch target address table 140a further includes an index section 141a and entry selection unit 143a.

The index section 141*a* stores a Next pointer, in addition to a table validity and index, which are included in the index section 141 of FIG. 7. A Next pointer points to an entry from which a predicted branch target address is to be output, out of the entries of the branch target address storage section 142. For example, a Next pointer of "0" points to the entry 0 of the branch target address storage section 142, and a Next pointer of "1" points to the entry 1 of the branch target address storage section 142. The initial value of the Next pointer is "0", and the value of the Next pointer is counted by the table management section 152*a*.

The entry selection unit 143*a* selects one of the entries of the branch target address storage section 142, and outputs the branch target address registered in the selected entry as a predicted branch target address to the table selection unit 153. When a selection request signal is output from the table management unit 152*a*, the entry selection unit 143*a* selects an entry pointed by the Next pointer of the index section 141*a* from the entries of the branch target address storage section 142.

The table management unit 152*a* selects a branch target address table 140*a* corresponding to the address of a branch instruction that has completed its execution, and determines a predicted branch target address based on the information registered in the selected branch target address table 140*a*. Unlike the table management unit 152 illustrated in FIG. 7, the table management unit 152*a* registers a branch target address in the branch target address storage section 142 only when a branch misprediction occurs, based on information indicating whether a prediction is correct or not, included in a branch instruction execution result received from the branch instruction execution control unit 119. The table management unit 152*a* also registers branch target addresses in the entries of the branch target address storage section 142 until there is no free entry. Compared with the second embodiment, such different features enable the table management unit 152*a* to predict a branch target even when branch target addresses appear in a more complicated recurring pattern.

Figure 12:
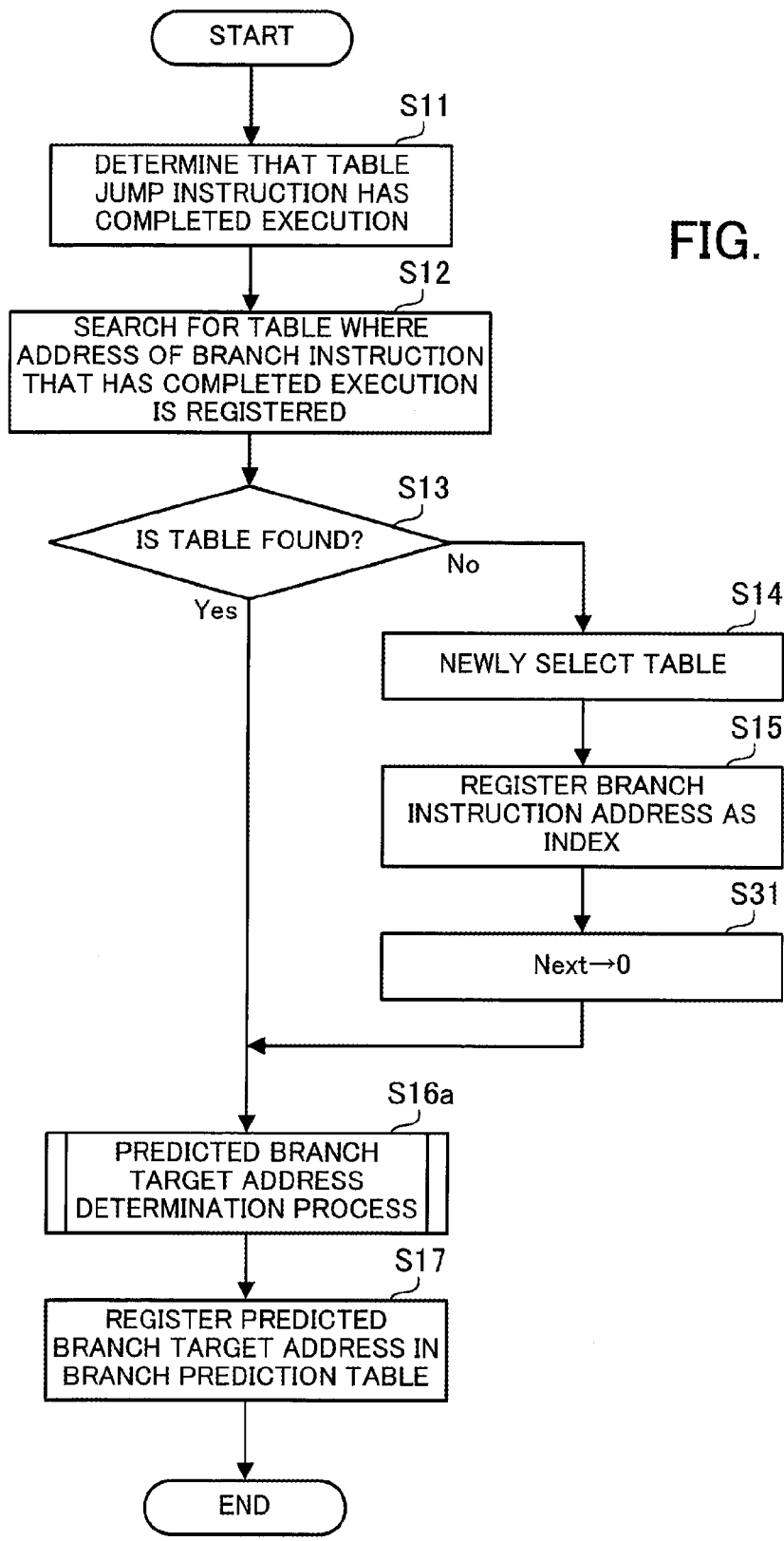
FIG. 12 is a flowchart illustrating how to predict a branch target of a table jump instruction according to the third embodiment.

FIG. 12 is a flowchart illustrating how to predict a branch target of a table jump instruction according to the third embodiment.

Step S11 in the process illustrated in FIG. 12 is the same as step S11 of FIG. 8. In addition, steps S12 to S15 and S17 are the same as steps S12 to S15 and S17 of FIG. 8, except that the table management unit 152*a* executes these steps in place of the table management unit 152, and the branch target address tables 140*a* are to be referenced instead of the branch target address tables 140. In addition, the other different features from the process of FIG. 8 are that step S31 is executed following step S15, and step S16*a* is executed instead of step S16.

Referring to FIG. 12, when the searching of step S12 results in detecting no branch target address table 140*a* where the branch instruction address included in a branch instruction execution result is registered (no at step S13), the table management unit 152*a* newly selects, for further processing, a branch target address table 140*a* having a table validity of "0" in the index section 141*a*. At this time, the table management unit 152*a* updates the table validity to in the selected branch target address table 140*a* (step S14). Then, the table management unit 152*a* registers, as an index, the branch instruction address included in the branch instruction execution result received from the branch instruction execution control unit 119, in the branch target address table 140*a* selected in step S14 (step S15).

Then, the table management unit 152*a* sets the Next pointer of the index section 141*a* to in the target address table 140*a* selected in step S14 (step S31). That is to say, in the newly validated branch target address table 140*a*, the Next pointer in the index section 141*a* is set to an initial value of "0". In this connection, steps S15 and S31 may be executed in a reverse order. Alternatively, these steps S15 and S31 may be executed in parallel.

If the searching of step S12 results in detecting a branch target address table 140*a* where the branch instruction address included in the branch instruction execution result is registered (yes in S13), or if the searching of step S12 results in detecting no branch target address table 140*a* where the branch instruction address included in the branch instruction execution result is registered (no in S13) and then steps S14, 15, and S31 are executed, the table management unit 152*a* determines a predicted branch target address based on the information registered in the branch target address table 140*a* selected for further processing and information indicating whether a prediction is correct or not, included in the branch instruction execution result received from the branch instruction execution control unit 119 (step S16*a*). After that, step S17 is executed.

Figure 13:
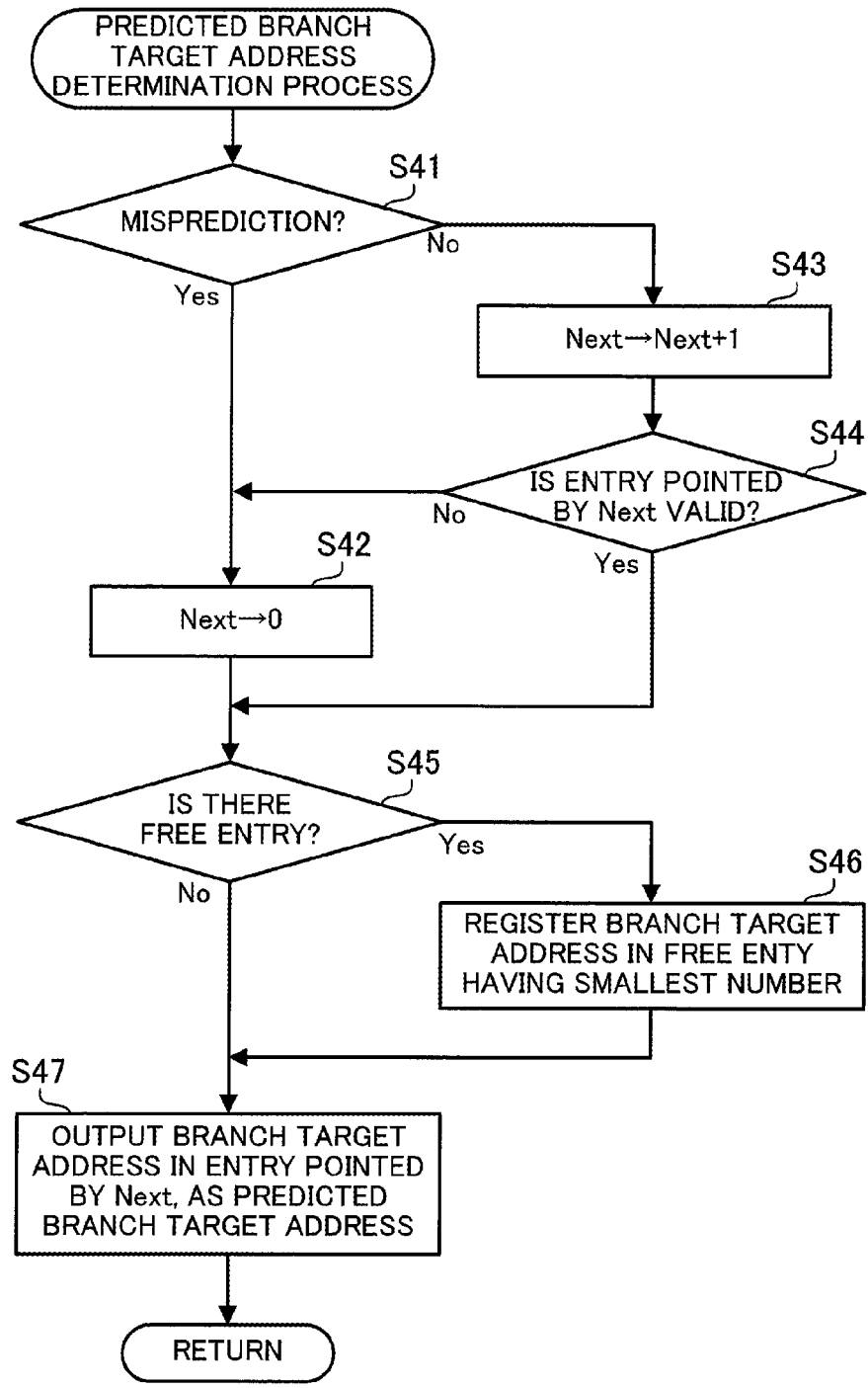
FIG. 13 is a flowchart illustrating how to determine a predicted branch target address according to the third embodiment.

FIG. 13 is a flowchart illustrating how to determine a predicted branch target address according to the third embodiment. The process of FIG. 13 corresponds to step S16*a* of FIG. 12.

(Step S41) The table management unit 152*a* determines based on information indicating whether a prediction is correct or not, included in a branch instruction execution result received from the branch instruction execution control unit 119, whether the branch target prediction is a misprediction or not. If the branch target prediction is a misprediction (yes at S41), the table management unit 152*a* executes step S42. If the branch target prediction is correct (no at S41), the table management unit 152*a* executes step S43.

(Step S42) The table management unit 152*a* sets the Next pointer of the index section 141*a* to "0" in the branch target address table 140*a* selected for further processing. Then, the table management unit 152 executes step S45.

(Step S43) The table management unit 152*a* increments, by "1", the Next pointer of the index section 141*a* in the branch target address table 140*a* selected for further processing.

(Step S44) The table management unit 152*a* determines whether the entry pointed by the current Next pointer, out of the entries of the branch target address table 140*a*, is valid or not. The entry pointed by the Next pointer is determined valid when the validity flag of the entry is "1" and a valid branch target address is registered in the entry. On the other hand, the entry pointed by the Next pointer is determined invalid when the validity flag of the entry is "0" or the Next pointer points to no entry (that is, the value of the Next pointer exceeds the number of entries in the branch target address storage section 142).

If the entry pointed by the Next pointer is valid (yes at S44), the table management unit 152*a* executes step S45. If the entry pointed by the Next pointer is invalid (no at S44), the table management unit 152*a* executes step S42.

(Step S45) The table management unit 152*a* determines whether the branch target address storage section 142 has any free entry with a validity flag of "0". If there is such a free entry (yes at step S45), the table management unit 152*a* executes step S46. If there is no such free entry (no at step S45), the table management unit 152*a* executes step S47.

(Step S46) The table management unit 152*a* updates the validity flag to "1" in the entry having the smallest number out of the free entries of the branch target address storage section 142, and registers the branch target address included in the branch instruction execution result. Then, step S47 is executed.

(Step S47) The table management unit 152a outputs a selection request signal to the entry selection unit 143a. Upon reception of the selection request signal, the entry selection unit 143a selects the entry pointed by the Next pointer from the entries of the branch target address storage section 142, and outputs the branch target address registered in the selected entry, to the table selection unit 153 as a predicted branch target address.

Through the above-described process of FIG. 13, the table management unit 152a accumulates branch target addresses in the branch target address storage section 142 each time a table jump instruction is executed until the branch target address storage section 142 has no free entry. In addition, if a branch target prediction is a misprediction, the table management unit 152a outputs the branch target address registered in the first entry of the branch target address storage section 142, as a predicted branch target address. Further, if the branch target prediction is correct and the entry next to the entry pointed by the current Next pointer is invalid, the table management unit 152a outputs the branch target address registered in the first entry of the branch target address storage section 142 as a predicted branch target address. On the other hand, if the branch target prediction is correct and the entry next to the entry pointed by the current Next pointer is valid, the table management unit 152a outputs the branch target address registered in the next entry as a predicted branch target address.

Figure 14:
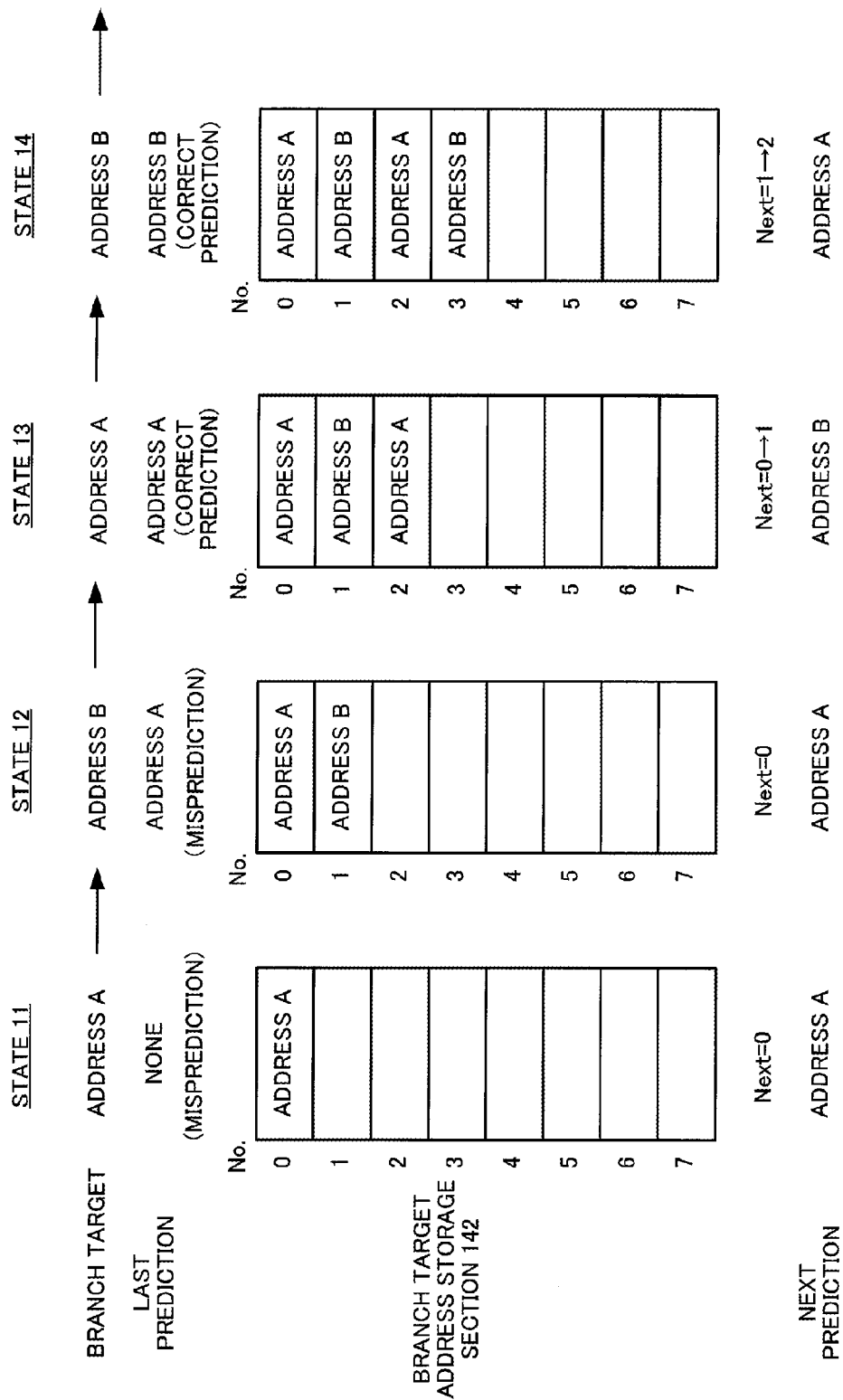
FIG. 14 illustrates a specific example of a branch target prediction process (part 1)
Figure 15:
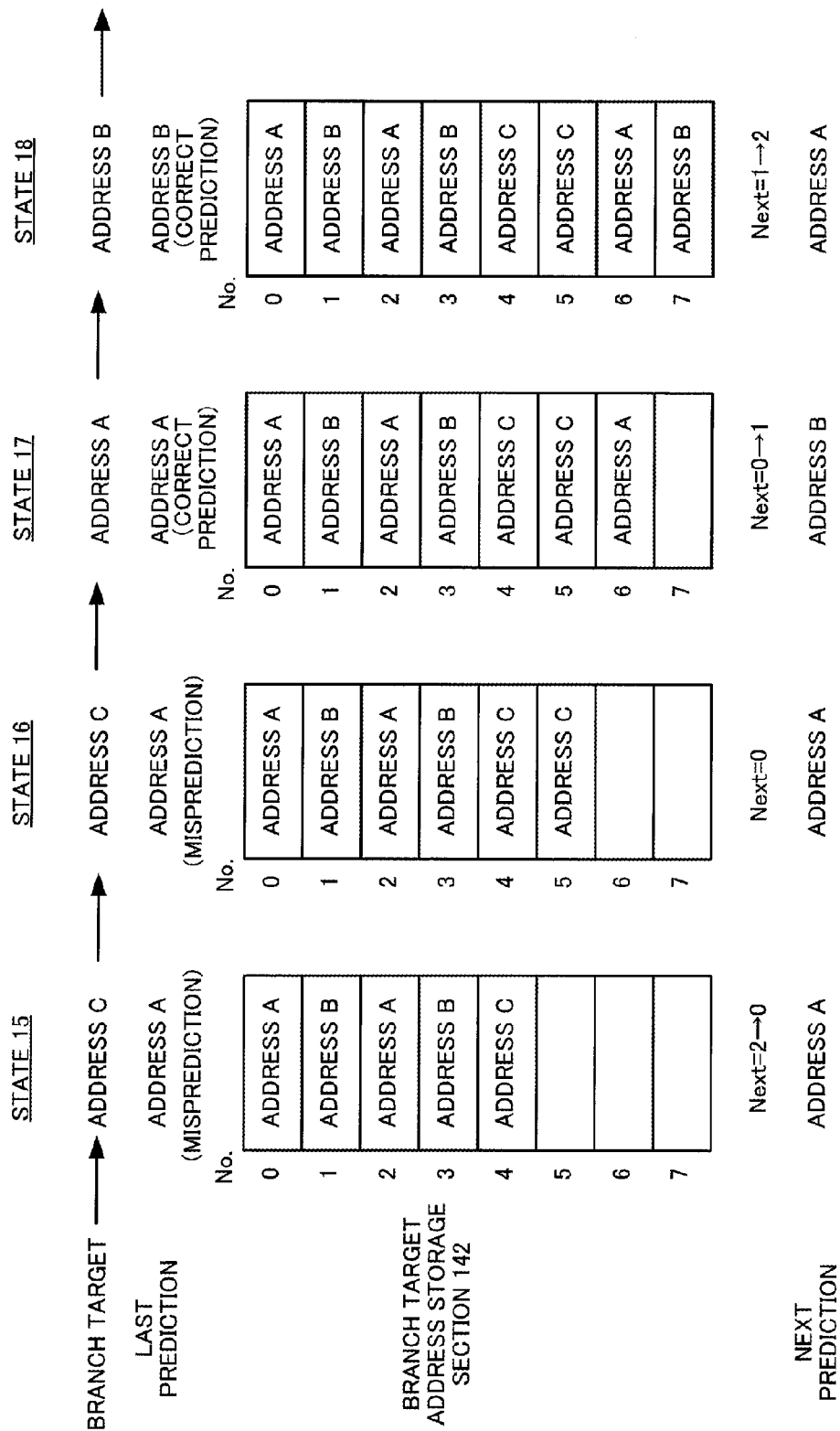
FIG. 15 illustrates the specific example of the branch target prediction process (part 2)
Figure 16:
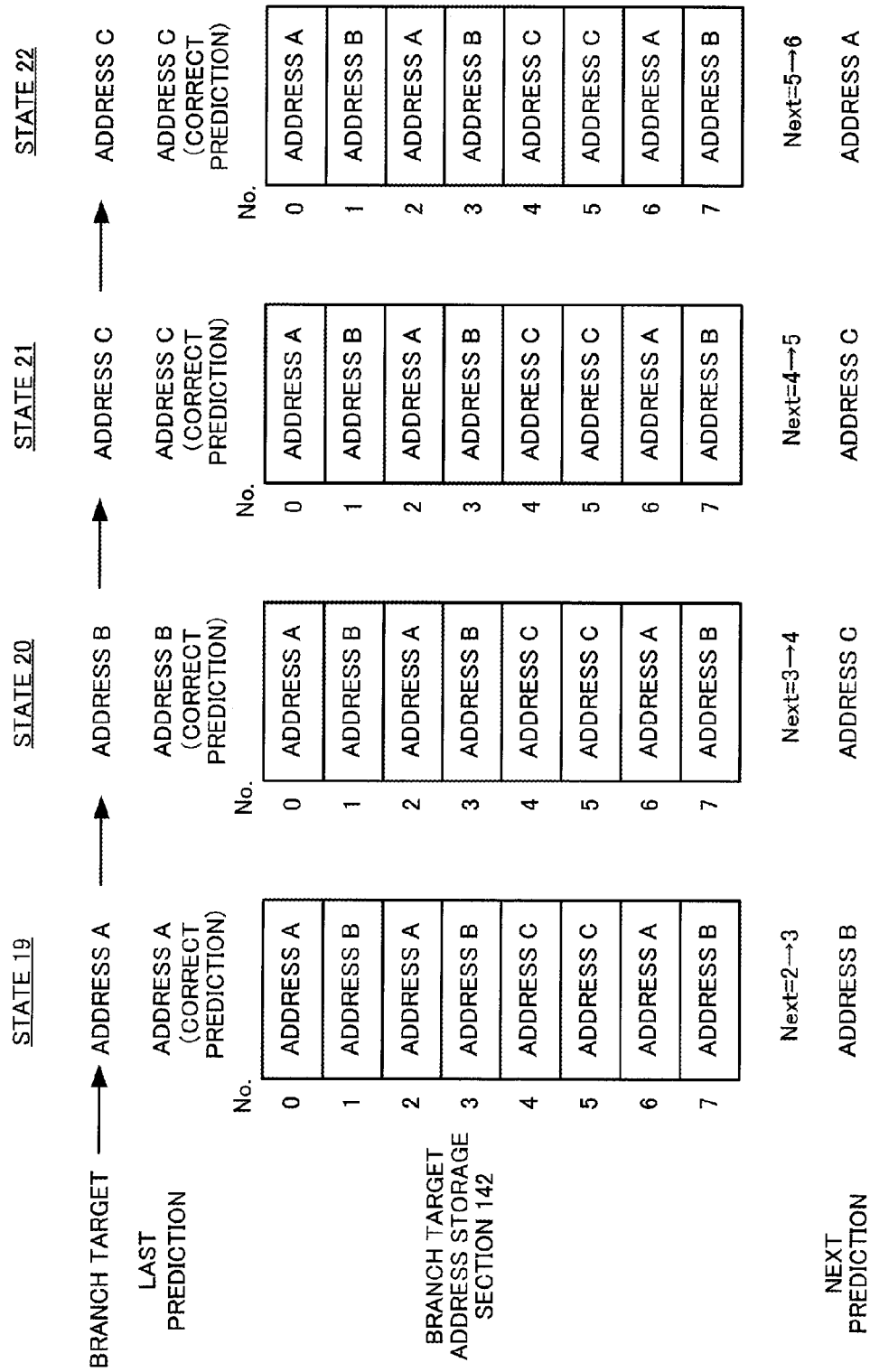
FIG. 16 illustrates the specific example of the branch target prediction process (part 3)

The following describes a specific example of how to predict a branch target with reference to branch target addresses registered in the branch target address table 140a, assuming that the program illustrated in FIG. 5 runs. FIGS. 14 to 16 illustrate a specific example of a branch target prediction process.

In FIGS. 14 to 16, it is assumed that, by way of example, executions of a table jump instruction result in the instruction addresses of branch targets appearing in a recurring pattern of addresses A, B, A, B, C, and C. The addresses A, B, and C are the addresses of instructions for executing processes Pa, Pb, and Pc of FIG. 5, respectively. In addition, in FIGS. 14 to 16, the branch target address storage section 142 includes 8 entries, labeled 0 to 7, by way of example.

First, in FIG. 14, assume that the execution of a table jump instruction makes a transition from a state where no branch target address is registered in the branch target address storage section 142 to a state 11 where the address A is determined as a branch target. In this state, the branch target prediction is a misprediction (yes at S41 of FIG. 13), the Next pointer keeps its value of "0" (S42), and the address A, which is a branch target, is registered in the entry 0 that is the first free entry of the branch target address storage section 142 (S46). In addition, the address A registered in the entry 0 is output as a predicted branch target address (S47). After that, branch target addresses are accumulated in the branch target address storage section 142 until the state reaches a state 18 where there are no free entries.

Then, assume that execution of the table jump instruction at the same address shifts the state to a state 12 where the address B is determined as a branch target. In this state, the branch target prediction is a misprediction (yes at S41 of FIG. 13), the Next pointer keeps its value of "0" (S42), and the address A registered in the entry 0 is output as a predicted branch target address (S47).

Then, in a state 13 where the address A is determined as a branch target, the branch target prediction is correct (no at S41 of FIG. 13). In this state, the Next pointer is incremented to "1" (S43), and the address B registered in the entry 1 is output as a predicted branch target address (S47). Then, even in a state 14 where the address B is determined as a branch target, the branch target prediction is correct (no at S41 of FIG. 13), the Next pointer is incremented to "2" (S43), and the address A registered in the entry 2 is output as a predicted branch target address (S47).

Then, as illustrated in FIG. 15, in a state 15 where the address C is determined as a branch target, the branch target prediction is a misprediction (yes at S41 of FIG. 13). In this state, the Next pointer is returned to "0" (S42), and the address A registered in the entry 0 is output as a predicted branch target address (S47). Then, even in a state 16 where the address C is determined as a branch target, the branch target prediction is a misprediction (yes at S41 of FIG. 13). The Next pointer keeps its value of "0" (S42), and the address A registered in the entry 0 is output as a predicted branch target address (S47).

When the predicted branch target address is output in the state 16, the branch target address storage section 142 stores one appearance pattern of branch target addresses. In addition, the Next pointer is returned to "0", and the predicted branch target address is output from the first entry. Therefore, after that, a correct branch target prediction continues while the branch target addresses appear in the pattern of address A (state 17), address B (state 18), address A (state 19), address B (state 20), address C (state 21), and address C (state 22). That is, the process of FIG. 13 makes it possible to predict a branch target for an appearance pattern of instruction addresses, A, B, A, B, C, and C, which is more complicated than the predictable pattern described in the second embodiment.

In this connection, in a state 24 (not illustrated) where the address B is determined as a branch target after the state 22 of FIG. 16, the prediction is correct but an entry corresponding to a value obtained by incrementing the Next pointer by "1" is invalid (no at S44), and therefore the Next pointer is returned to "0". Then, in states 25 and 26 (not illustrated) where the addresses A and B are determined as a branch target, respectively, the prediction is correct. However, in a state 27 (not illustrated) where the address C is determined as a branch target, the prediction is a mispredition, and the Next pointer is therefore returned to "0". Then, even in a state 28 where the address C is determined as a branch target (not illustrated), the prediction is a misprediction, and the Next pointer keeps its value of "0". After that, a correct prediction continues eight times in a row, starting with a state 29 (not illustrated) where the address A is determined as a branch target.

That is, the process of FIG. 13 makes it possible to predict a branch target at a 50% or higher probability in the case where there appears a pattern of a fewer number of instruction addresses than the number of entries of the branch target address storage section 142.

The above-described third embodiment is able to provide the same effects as the second embodiment that provides the effect of predicting a branch target of a table jump instruction and thus makes it possible to suppress an increase in manufacturing and development costs and also in the size of a circuit. In addition, compared with the second embodiment, the third embodiment makes it possible to predict a branch target for a more complicated appearance pattern of instruction addresses.

Forth Embodiment

Figure 17:
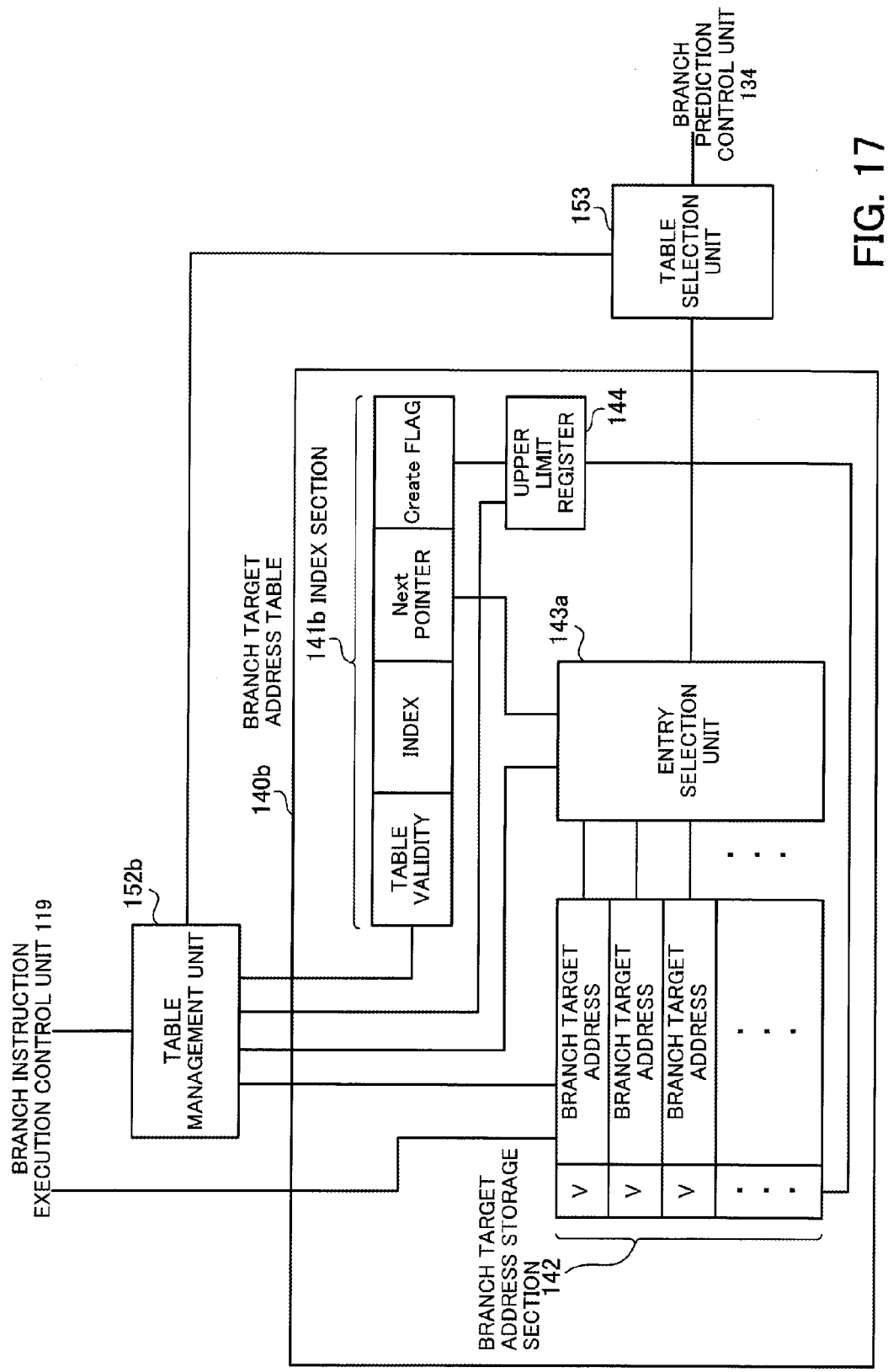
FIG. 17 illustrates an example of a main configuration of an arithmetic processing apparatus according to a fourth embodiment.

FIG. 17 illustrates an example of a main configuration of an arithmetic processing apparatus according to a fourth embodiment. In FIG. 17, the same reference numerals are given to constituent elements corresponding to those of FIG. 11.

Compared with the arithmetic processing apparatus according to the third embodiment, the arithmetic processing apparatus according to the fourth embodiment has a different structure for branch target address tables and a different procedure for a table management unit to predict a prediction target using a branch target address table. More specifically, in place of the branch target address table 140a and table management unit 152a illustrated in FIG. 11, the arithmetic processing apparatus according to the fourth embodiment is provided with a branch target address table 140b and a table management unit 152b as illustrated in FIG. 17. In this connection, similarly to the third embodiment, a plurality of branch target address tables 140b is provided.

Similarly to the branch target address table 140a illustrated in FIG. 11, each branch target address table 140b includes a branch target address storage section 142 and entry selection unit 143a. Each branch target address table 140b further includes an index section 141b and upper limit register 144.

The index section 141b includes a Create flag, in addition to a table validity, index, and Next pointer which are included in the index section 141a of FIG. 11. The Create flag is set by the table management unit 152b, and indicates whether it is currently in an entry registration period for the branch target address storage section 142 or not. The entry registration period is a period during which there is no sufficient information held for predicting a branch target address. In other words, the entry registration period is a period during which registration of branch target addresses that are predicted branch target candidates have not been completed in the branch target address storage section 142. In this embodiment, the Create flag of "1" indicates that it is in the entry registration period for the branch target address storage section 142. Then, when the entry registration period ends, the Create flag is updated to "0".

The upper limit register 144 has a function of counting the number of valid entries (that is, entries having a validity flag of "1") in the branch target address storage section 142. In this connection, the minimum value of the upper limit register 144 is "0", and the counting is performed in such a way that the upper limit register 144 is "0" when there is one valid entry and the upper limit register 144 is "1" when there are two valid entries, . . . . When the Create flag is changed to "1", the upper limit register 144 counts the number of valid entries in the branch target address storage section 142, and holds the count value, so as to allow the table management unit 152b to refer to the count value.

The table management unit 152b selects a branch target address table 140b corresponding to the address of a branch instruction that has completed its execution, and determines a predicted branch target address on the basis of the information registered in the selected branch target address table 140b, and information indicating whether a prediction is correct or not, included in a branch instruction execution result received from the branch instruction execution control unit 119. In addition, when the entry registration period for the branch target address storage section 142 ends (that is, the Create flag is set to "0"), the table management unit 152b starts the counting operation of the Next pointer with the value of the upper limit register 144 as an upper limit.

Figure 18:
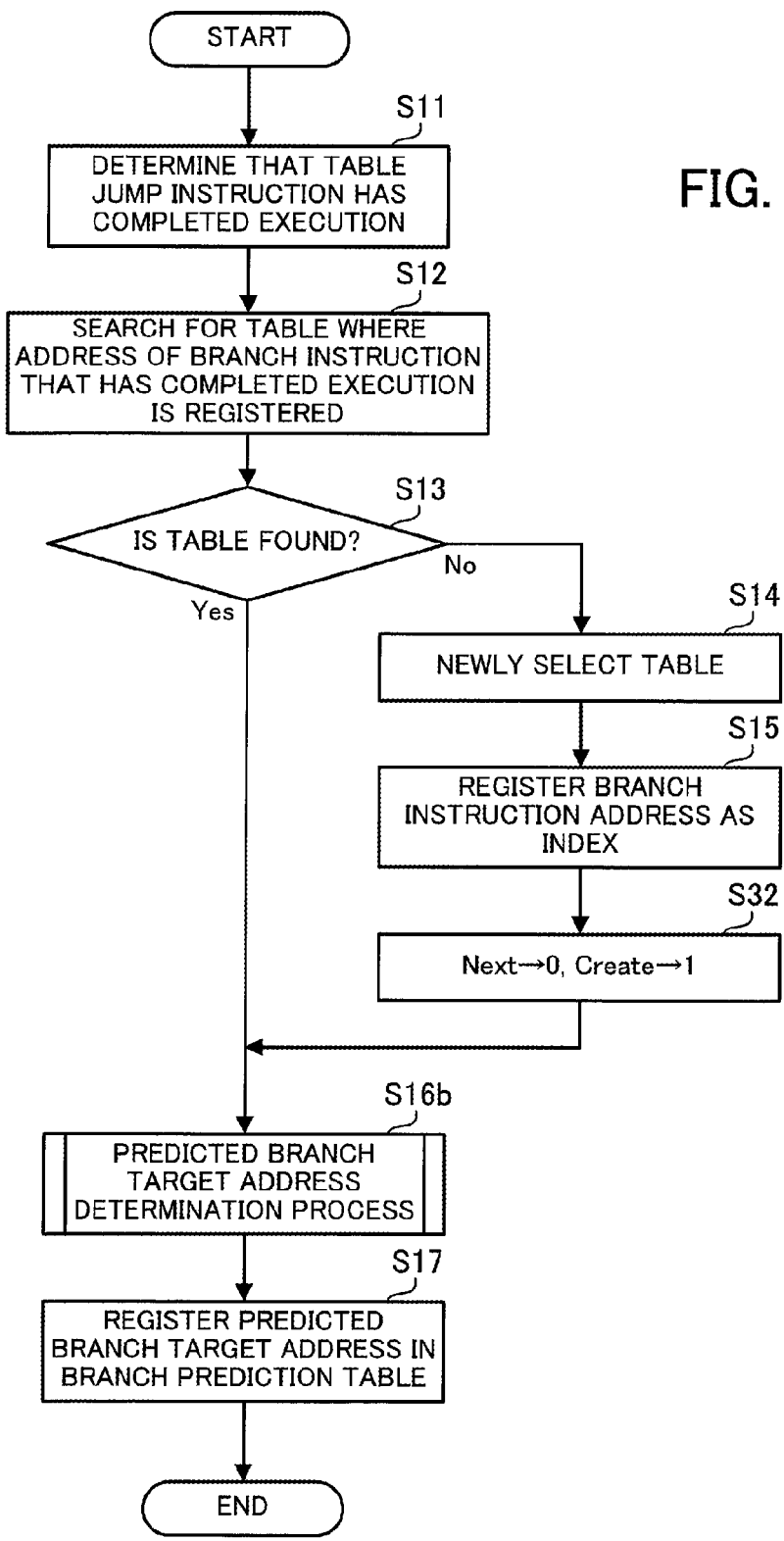
FIG. 18 is a flowchart illustrating how to predict a branch target of a table jump instruction according to the fourth embodiment.

FIG. 18 is a flowchart illustrating how to predict a branch target of a table jump instruction according to the fourth embodiment.

Out of the process of FIG. 18, step S11 is the same as step S11 of FIGS. 8 and 12. In addition, steps S12 to 15 and S17 are the same as steps S12 to 15 and S17 of FIG. 12 except that, in place of the table management unit 152a, the table management unit 152b executes these steps and, in place of the branch target address tables 140a, the branch target address tables 140b is to be referenced. In addition, the other different features from the process of FIG. 12 are that steps S32 and S16b are executed instead of steps S31 and S16a, respectively.

Referring to FIG. 18, when the searching of step S12 results in detecting no branch target address table 140b where the branch instruction address included in a branch instruction execution result is registered (no at S13), the table management unit 152b newly selects, for further processing, a branch target address table 140b having a table validity of "0" indicating invalidity in the index section 141b. At this time, the table management unit 152b updates the table validity to "1" in the selected branch target address table 140b (step S14). Then, the table management unit 152b registers the branch instruction address included in the branch instruction execution result received from the branch instruction execution control unit 119 in the branch target address table 140b selected in step S14 (step S15).

Then, the table management unit 152b sets the Next pointer to "0" and the Create flag to "1" in the index section 141b in the branch target address table 140b selected in step S14 (step S32). That is, in the newly validated branch target address table 140b, the Next pointer in the index section 141b is set to an initial value of "0" and the Create flag is set to "1". In this connection, steps S15 and S32 may be executed in a reverse order. Alternatively, these steps S15 and S32 are executed in parallel.

If the searching of step S12 results in detecting a branch target address table 140b where the branch instruction address included in the branch instruction execution result is registered (yes in S13), or if the searching of step S12 results in detecting no branch target address table 140b where the branch instruction address included in the branch instruction execution result is registered (no in S13) and then steps S14, 15, and S32 are executed, the table management unit 152b determines a predicted branch target address based on the information registered in the branch target address table 140b selected for further processing, and information indicating whether a prediction is correct or not, included in the branch instruction execution result received from the branch instruction execution control unit 119 (step S16b). After that, step S17 is executed.

Figure 19:
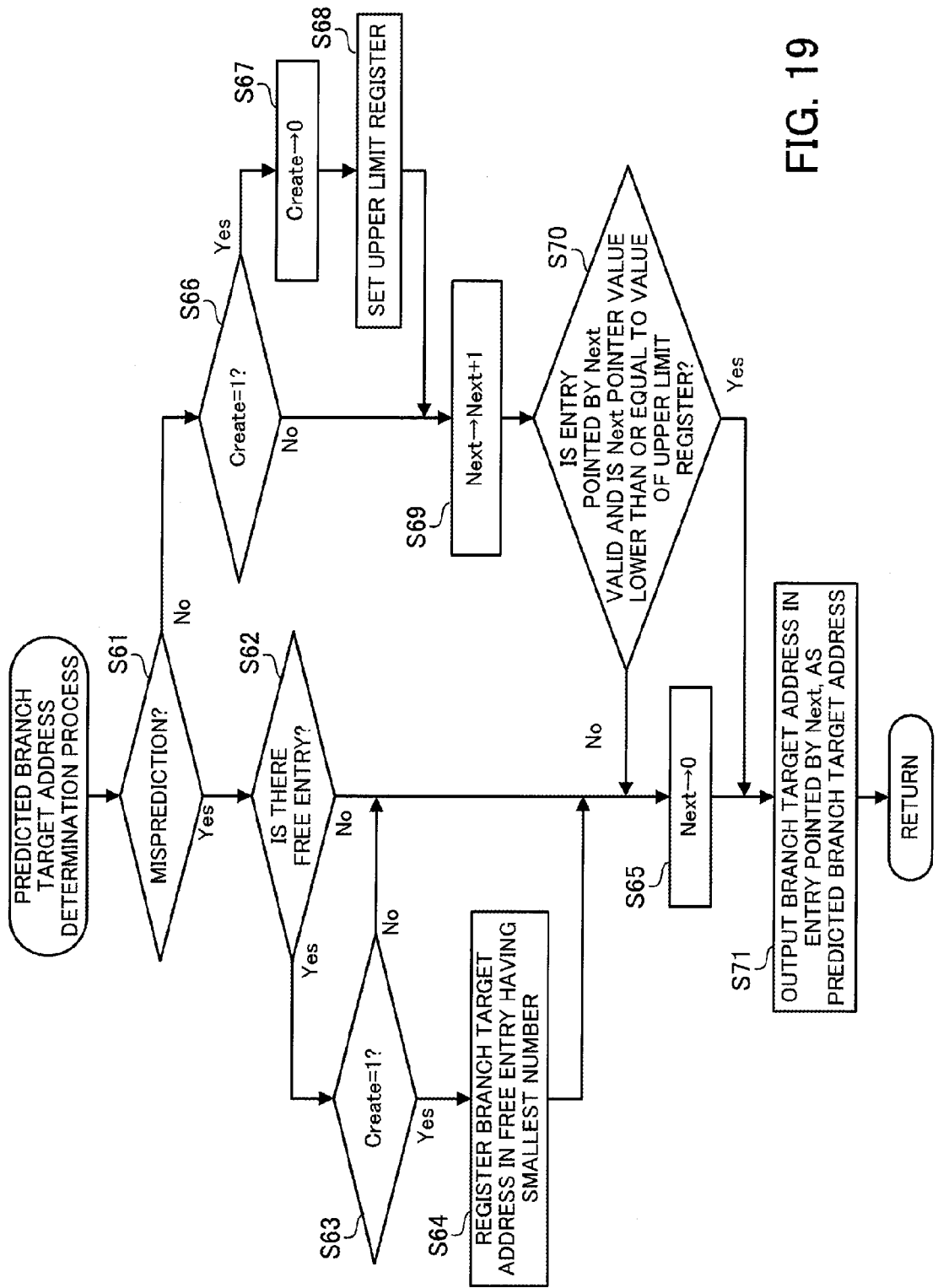
FIG. 19 is a flowchart illustrating how to determine a predicted branch target address according to the fourth embodiment.

FIG. 19 is a flowchart illustrating how to determine a predicted branch target address according to the fourth embodiment. The process of FIG. 19 corresponds to step S16b of FIG. 18.

(Step S61) The table management unit 152b determines whether a branch target prediction is a misprediction or not, based on information indicating whether a prediction is correct or not, included in a branch instruction execution result received from the branch instruction execution control unit 119. When determining that the branch target prediction is a misprediction (yes at S61), the table management unit 152b executes step S62. When determining that the branch target prediction is correct (no at S61), the table management unit 152b executes step S66.

(Step S62) The table management unit 152b determines whether there is a free entry having a validity flag of "0" in the branch target address storage section 142 in the branch target address table 140b selected for further processing. If there is such a free entry (yes at S62), the table management unit 152b executes step S63. If there is no such free entry (no at S62), the table management unit 152b executes step S65.

(Step S63) The table management unit 152b refers to the Create flag in the index section 141b. If the Create flag is "1" (yes at S63), the table management unit 152b executes step S64. If the Create flag is "0" (no at S63), the table management unit 152b executes step S65.

(Step S64) The table management unit 152b updates the validity flag to "1" in the entry having the smallest number out of the free entries of the branch target address storage section 142, and registers the branch target address included in the branch instruction execution result. Then, the table management unit 152b executes step S65.

(Step S65) The table management unit 152b sets the Next pointer to "0" in the index section 141b, and then executes step S71.

(Step S66) The table management unit 152b determines whether the Create flag of the index section 141b is "1" or not in the branch target address table 140b selected for further processing. If the Create flag is "1" (yes at S66), the table management unit 152b executes step S67. If the create flag is "0" (no at S66), the table management unit 152b executes step S69.

(Step S67) The table management unit 152b updates the Create flag to "0".

(Step S68) When detecting that the Create flag is changed to "0", the upper limit register 144 counts the number of valid entries in the branch target address storage section 142, and holds the count value. Then, step S69 is executed.

(Step S69) The table management unit 152b increments the Next pointer of the index section 141b by "1".

(Step S70) The table management unit 152b determines whether or not the entry pointed by the Next pointer, out of the entries of the branch target address storage section 142, is valid and the value of the Next pointer is lower than or equal to the value held in the upper limit register 144. When these conditions are satisfied (yes at S70), the table management unit 152b executes step S71. When these conditions are not satisfied (no at S70), the table management unit 152b executes step S65.

(Step S71) The table management unit 152b outputs a selection request signal to the entry selection unit 143a. Upon reception of the selection request signal, the entry selection unit 143 selects an entry pointed by the Next pointer from the entries of the branch target address storage section 142, and outputs the branch target address registered in the selected entry as a predicted branch target address to the table selection unit 153.

According to the above-described process of FIG. 19, in the initial state, the table management unit 152b sequentially registers a branch target address in an entry in order from the first entry of the branch target address storage section 142 each time a table jump instruction completes its execution. In addition to this, the table management unit 152b outputs a branch target address registered in the first entry of the branch target address storage section 142, as a predicted branch target address until a correct branch target prediction is obtained for the first time (that is, while the Create flag is "1").

When a correct branch target prediction is obtained for the first time, the table management unit 152b completes registration of addresses to the branch target address storage section 142. Thereby, a history of branch target addresses obtained until immediately before the same branch target address appears as a result of executing a table jump instruction is registered in the branch target address storage section 142.

In addition, when a correct branch target prediction is obtained for the first time, the table management unit 152b sets the upper limit register 144 to the current value of the Next pointer as the upper limit of the Next pointer, and after that outputs the branch target address registered in the entry pointed by the Next pointer, as a predicted branch target address. Each time a branch target prediction is correct, the table management unit 152b increments the Next pointer, and when a branch target prediction is a misprediction or the incremented value of the Next pointer exceeds the upper limit, returns the Next pointer to "0".

Figure 20:
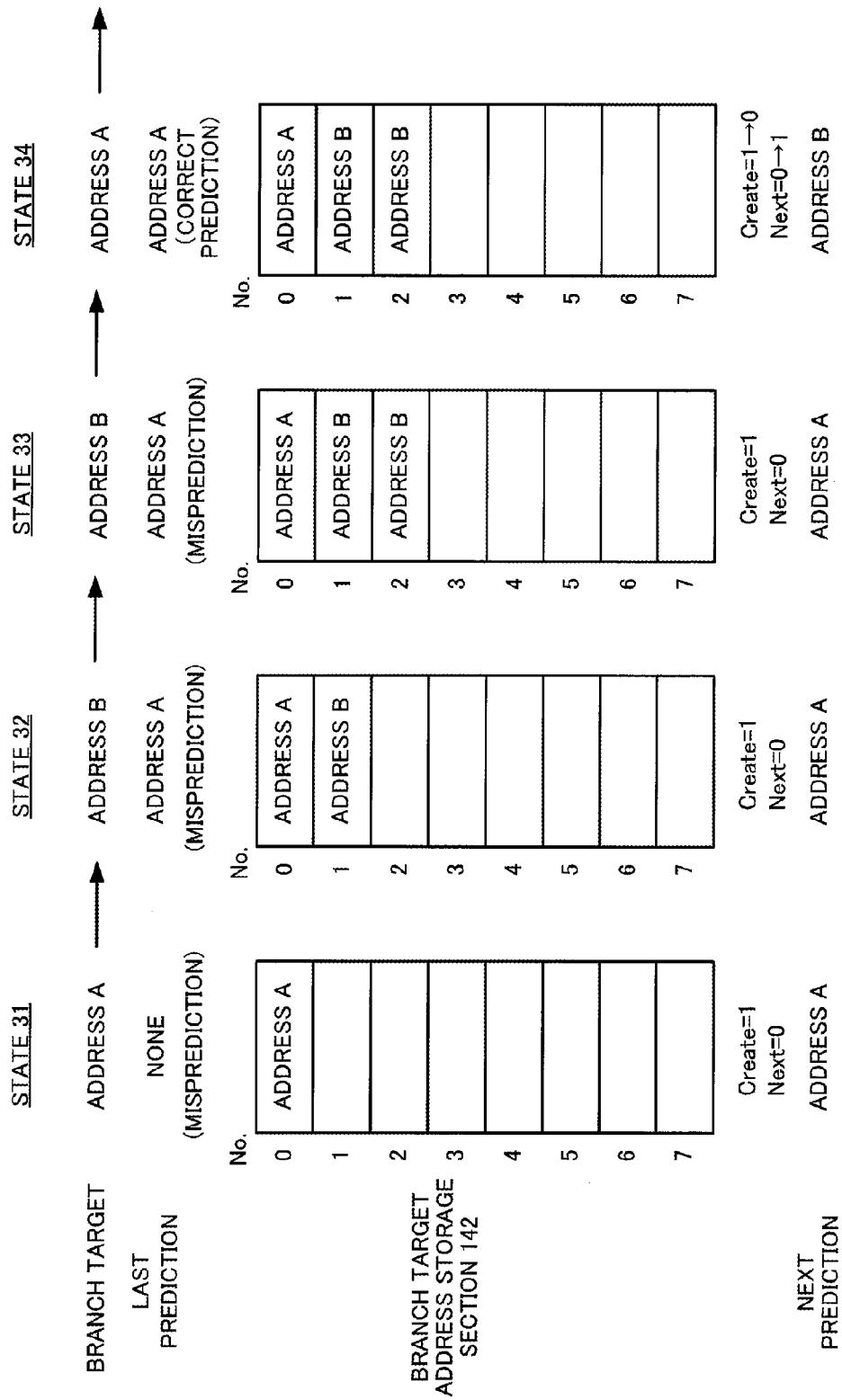
FIG. 20 illustrates a specific example of a branch target prediction process (part 1)
Figure 21:
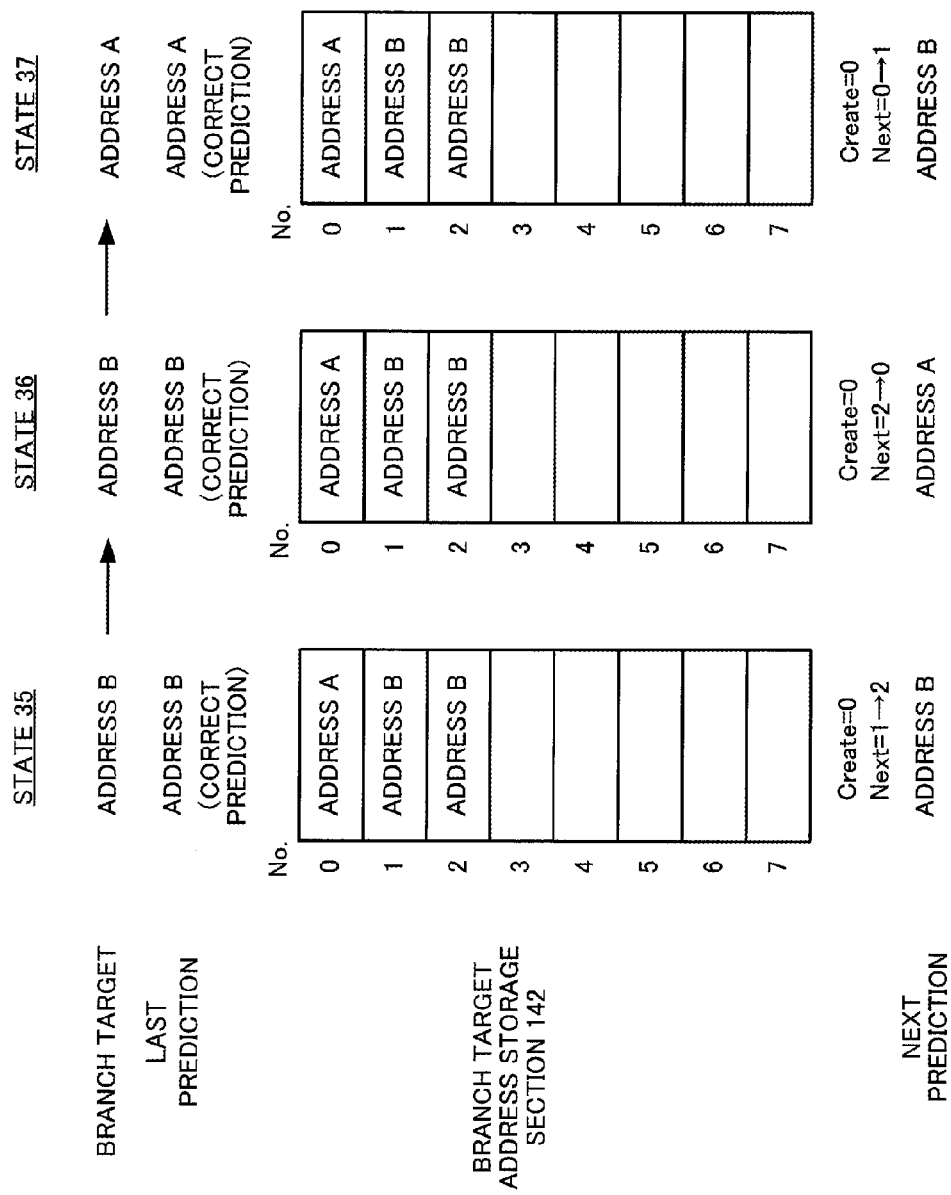
FIG. 21 illustrates the specific example of the branch target prediction process (part 2)

The following describes a specific example of how to predict a branch target with reference to branch target addresses registered in the branch target address table 140b, assuming that the program of FIG. 5 runs. FIGS. 20 and 21 illustrate a specific example of a branch target prediction process.

In FIGS. 20 and 21, it is assumed, by way of example, that executions of a table jump instruction result in the instruction addresses of branch targets appearing in a recurring pattern of addresses A, B, and B.

First, assume in FIG. 20 that execution of a table jump instruction makes a transition from a state where no branch target address is registered in the branch target address storage section 142 to a state 31 where an address A is determined as a branch target. In this state, the branch target prediction is a misprediction (yes at S61 of FIG. 19), and the Create flag is "1" (yes at S63). Therefore, the address A, which is a branch target, is registered in the entry 0, which is the first free entry, in the branch target address storage section 142 (S64). In addition, the Next pointer keeps its value of "0" (S65), and the address A registered in the entry 0 is output as a predicted branch target address (S71).

Then, assume that execution of the table jump instruction at the same address shifts the state to a state 32 where the address B is determined as a branch target. In this state, the branch target prediction is a misprediction (yes at S61), and the Create flag is "1" (yes at S63). Therefore, the address B, which is a branch target, is registered in the entry 1 in the branch target address storage section 142 (S64). In addition, the Next pointer keeps its value of "0" (S65), and the address A registered in the entry 0 is output as a predicted branch target address (S71).

Similarly, in a state 33 where the address B is determined as a branch target, the branch target prediction is a misprediction (yes at S61), and the Create flag is "1" (yes at S63). Therefore, the address B, which is a branch target, is registered in the entry 2 in the branch target address storage section 142 (S64). In addition, the Next pointer keeps its value of "0" (S65), and the address A registered in the entry 0 is output as a predicted branch target address (S71).

Then, in a state 34 where the address A is determined as a branch target, the branch target prediction is correct (no at S61), and the Create flag is updated to "0" (S67). In this state, the upper limit register 144 is set to "2" that is the number of valid entries in the branch target address storage section 142 (S68), and the Next pointer is incremented to "1" (S69). The entry 1 in the branch target address storage section 142 is valid, and the value of the Next pointer is lower than or equal to the value of the upper limit register 144 (yes at S70). Therefore, the branch target address registered in the entry 1 in the branch target address storage section 142 is output as a predicted branch address (S71). In this connection, the Create flag is updated to "0" in the state 34, so that branch target addresses are no more registered in the branch target address storage section 142 after that.

Then, as illustrated in FIG. 21, even in a state 35 where the address B is determined as a branch target address, the branch target prediction is correct, and the Next pointer is incremented to "2". Further, even in a state 36 where the address B is determined as a branch target address, the branch target prediction is correct. In this state, the value obtained by incrementing the Next pointer by "1" (S69) exceeds the value of the upper limit register 144 (no at S70). Therefore, the Next pointer is returned to "0" (S65). Therefore, the branch target address registered in the entry 0 in the branch target address storage section 142 is output as a predicted branch target address.

After that, a correct branch target prediction continues while branch target addresses appear in a recurring pattern of addresses A, B, and B. That is, the process of FIG. 19 makes it possible to predict a branch target for an appearance pattern of instruction addresses, A, B, and B, which has more flexibility than the predictable pattern described in the second embodiment.

The above-described fourth embodiment is able to provide the same effects as the second and third embodiments that provide the effect of predicting a branch target of a table jump instruction and thus make it possible to suppress an increase in manufacturing and development costs and also in the size of a circuit. In addition, compared with the second embodiment, the fourth embodiment makes it possible to predict a branch target for a more flexible appearance pattern of instruction addresses, thus improving prediction accuracy.

Fifth Embodiment

Figure 22:
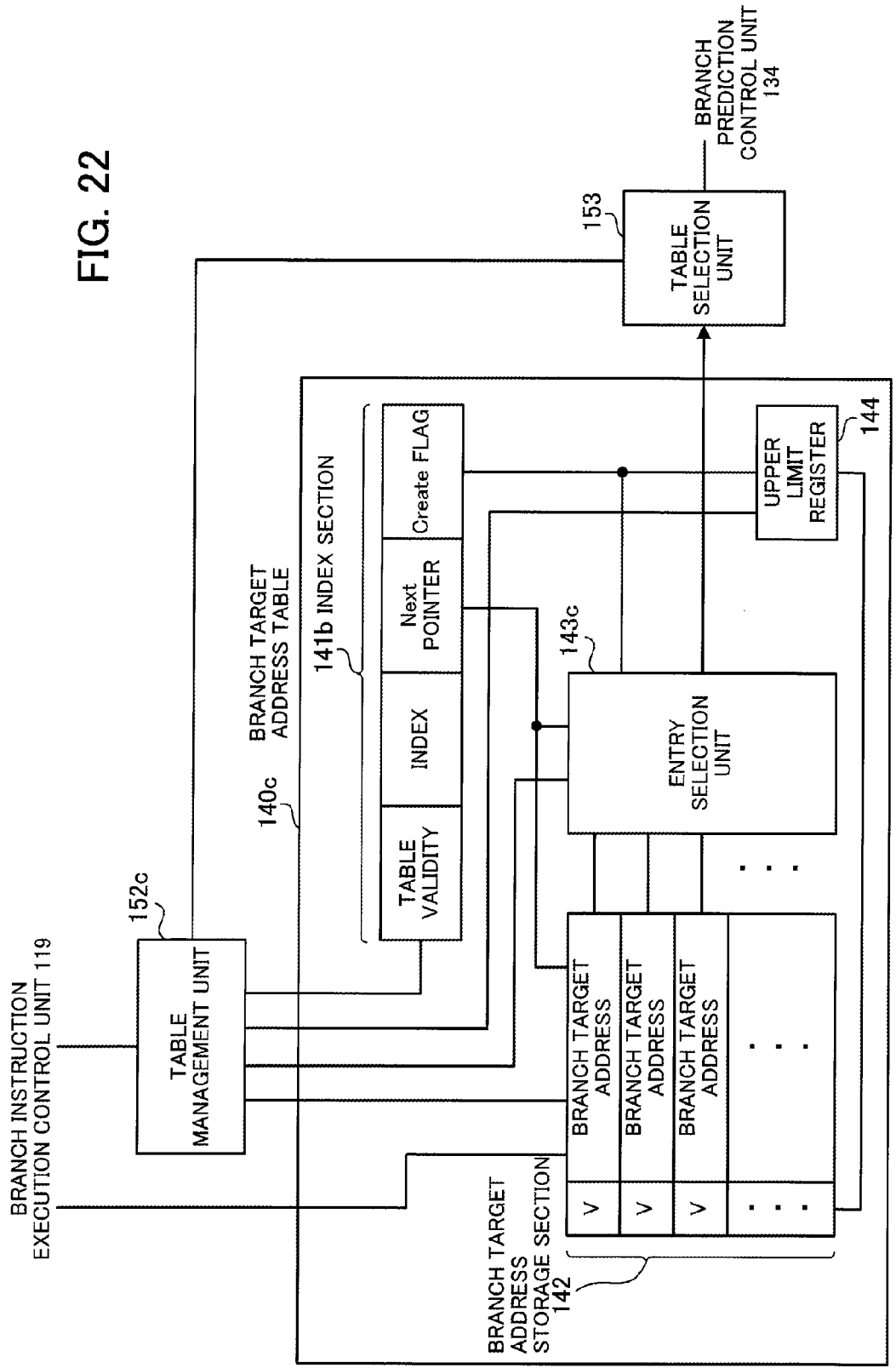
FIG. 22 illustrates an example of a main configuration of an arithmetic processing apparatus according to a fifth embodiment.

FIG. 22 illustrates an example of a main configuration of an arithmetic processing apparatus according to a fifth embodiment. In FIG. 22, the same reference numerals are given to constituent elements corresponding to those of FIG. 17.

Compared with the arithmetic processing apparatus according to the fourth embodiment, the arithmetic processing apparatus according to the fifth embodiment has a different structure for branch target address tables and a different procedure for a table management unit to predict a prediction target using a branch target address table. More specifically, in place of the branch target address table 140b and table management unit 152b illustrated in FIG. 17, the arithmetic processing apparatus according to the fifth embodiment is provided with a branch target address table 140c and table management unit 152c as illustrated in FIG. 22. In this connection, similarly to the fourth embodiment, a plurality of branch target address tables 140c is provided.

Similarly to the branch target address table 140b illustrated in FIG. 17, each branch target address table 140c includes a branch target address storage section 142, index section 141b, and upper limit register 144. In this connection, a Next pointer of the index section 141b is output not only to an entry selection unit 143c but also to a branch target address storage section 142, and is also used for determining a branch target address for the branch target address storage section 142.

Each branch target address table 140c further includes the entry selection unit 143c. Similarly to the entry selection unit 143 of FIG. 17, the entry selection unit 143c selects one of the entries of the branch target address storage section 142, and outputs the branch target address registered in the selected entry to a table selection unit 153. In this connection, if a Create flag is "1" when a selection request signal is received from the table management unit 152c, the entry selection unit 143c selects the entry 0 (first entry) in the branch target address storage section 142. If a Create flag is "0" when the selection request signal is received from the table management unit 152c, the entry selection unit 143c selects an entry pointed by the Next pointer from the entries of the branch target address storage section 142.

The table management unit 152c selects a branch target address table 140c corresponding to the address of a branch instruction that has completed its execution, and determines a predicted branch target address based on information registered in the selected branch target address table 140c and information indicating whether a prediction is correct or not, included in a branch instruction execution result received from the branch instruction execution control unit 119. In the process performed by the table management unit 152c, main different features from the process performed by the table management unit 152b of FIG. 17 are that only a registration request signal is output to the branch target address storage section 142 when a branch target address is registered in the branch target address storage section 142, and a destination entry for registering a branch target address is not designated. However, the table management unit 152c may be designed to designate the destination entry for registering a branch target address to the branch target address storage section 142.

The following describes a process performed by the arithmetic processing apparatus according to the fifth embodiment. A procedure of how to predict a branch target of a table jump instruction in this embodiment is basically the same as the procedure illustrated in FIG. 18, and therefore the procedure will not be illustrated. Different features from the process of FIG. 18 are that steps S12 to S15 and S17 are executed by a table management unit 152c in place of the table management unit 152b, the branch address tables 140c are to be referenced instead of the branch address tables 140b, and step S16b is executed in accordance with a procedure illustrated in FIG. 23.

Figure 23:
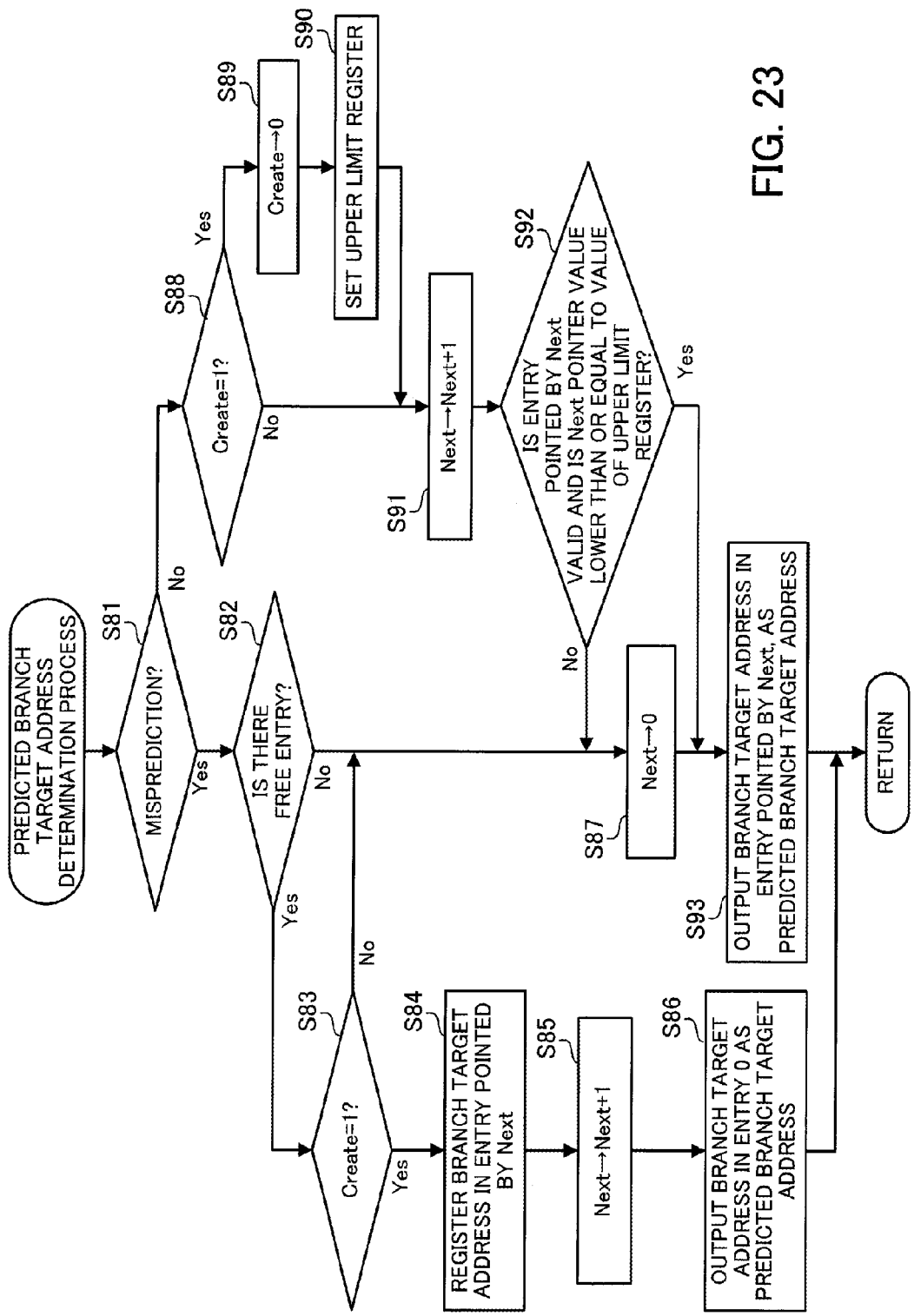
FIG. 23 is a flowchart illustrating how to determine a predicted branch target address according to the fifth embodiment.

FIG. 23 is a flowchart illustrating how to determine a predicted branch target address according to the fifth embodiment. The process of FIG. 23 corresponds to step S16b of FIG. 18.

(Step S81) The table management unit 152c determines based on information indicating whether a prediction is correct or not, included in a branch instruction execution result received from the branch instruction execution control unit 119, whether a branch target prediction is a misprediction or not. If the branch target prediction is a misprediction (yes at S81), the table management unit 152c executes step S82. If the branch target prediction is correct (no at S81), the table management unit 152c executes step S88.

(Step S82) The table management unit 152c determines whether there is a free entry having a validity flag of "0" in the branch target address storage section 142 in the branch target address table 140c selected for further processing. If there is such a free entry (yes at S82), the table management unit 152c executes step S83. If there is no such free entry (no at S82), the table management unit 152c executes step S87.

In this connection, the determination on whether there is a free entry in the branch target address storage section 142 may be made based on the value of the Next pointer. In this case, the table management unit 152c determines that there is a free entry if the value of the Next pointer is lower than or equal to the maximum number of entries in the branch target address storage section 142, and determines that there is no free entry if the value of the Next pointer exceeds the maximum number of entries.

(Step S83) The table management unit 152c refers to the Create flag in the index section 141b. The table management unit 152c executes step S84 if the Create flag is "1" (yes at S83), and executes step S87 if the Create flag is "0" (no at S83).

(Step S84) The table management unit 152c outputs a registration request signal to the branch target address storage section 142. Upon receipt of the registration request signal, the branch target address storage section 142 registers the branch target address included in the branch instruction execution result received from the branch instruction execution control unit 119, in the entry pointed by the Next pointer out of the entries of the own branch target address storage section 142.

(Step S85) The table management unit 152c increments the Next pointer by "1" in the index section 141b.

(Step S86) The table management unit 152c outputs a selection request signal to the entry selection unit 143c. Upon reception of the selection request signal, the entry selection unit 143c refers to the Create flag. Since the Create flag is currently "1", the entry selection unit 143c selects the first entry (entry 0) of the branch target address storage section 142, and outputs the branch target address registered in the selected entry to the table selection unit 153 as a predicted branch target address.

(Step S87) The table management unit 152c updates the Next pointer to "0". Then, step S93 is executed.

(Step S88) When the branch target prediction is correct (no at S81), the table management unit 152c determines whether the Create flag of the index section 141b is "1" or not in the branch target address table 140c selected for further processing. The table management unit 152c executes step S89 if the Create flag is "1" (yes at S88), and executes step S91 if the Create flag is "0" (no at S88).

(Step S89) The table management unit 152c updates the Create flag to "0".

(Step S90) When detecting that the Create flag is changed to "0", the upper limit register 144 counts the number of valid entries in the branch target address storage section 142, and holds the count value. Then, step S91 is executed.

(Step S91) The table management unit 152c increments the Next pointer of the index section 141b by "1".

(Step S92) The table management unit 152c determines whether or not the entry pointed by the Next pointer out of the entries of the branch target address storage section 142 is valid and the value of the Next pointer is lower than or equal to the value held in the upper limit register 144. The table management unit 152 executes step S93 if these conditions are satisfied (yes at S92), and executes step S87 if these conditions are not satisfied (no at S92).

(Step S93) The table management unit 152c outputs a selection request signal to the entry selection unit 143c. On reception of the selection request signal, the entry selection unit 143c refers to the Create flag. Since the Create flag is currently "0", the entry selection unit 143c selects the entry pointed by the Next pointer from the entries of the branch target address storage section 142, and outputs the branch target address registered in the selected entry, to the table selection unit 153 as a predicted branch target address.

According to the above-described process of FIG. 23, in the initial state, a branch target address is sequentially registered in an entry in order from the first entry of the branch target address storage section 142 each time a table jump instruction completes its execution. In addition to this, a branch target address registered in the first entry of the branch target address storage section 142 is output as a predicted branch target address until a correct branch target prediction is obtained for the first time (that is, while the Create flag is "1"). Then, when a correct branch target prediction is obtained for the first time, registration of addresses to the branch target address storage section 142 is completed. Thereby, a history of branch target addresses obtained until immediately before the same branch target address appears as a result of executing a table jump instruction is registered in the branch target address storage section 142.

In addition, when a correct branch target prediction is obtained for the first time, the table management unit 152c sets the upper limit register 144 to the current value of the Next pointer as the upper limit of the Next pointer, and at the same time, updates the Create flag to "0". After that, the branch target address registered in the entry pointed by the Next pointer is output as a predicted branch target address. Each time a branch target prediction is correct, the table management unit 152c increments the Next Pointer, and when a branch target prediction is a misprediction or the incremented value of the Next pointer exceeds the upper limit, returns the Next pointer to "0".

Figure 24:
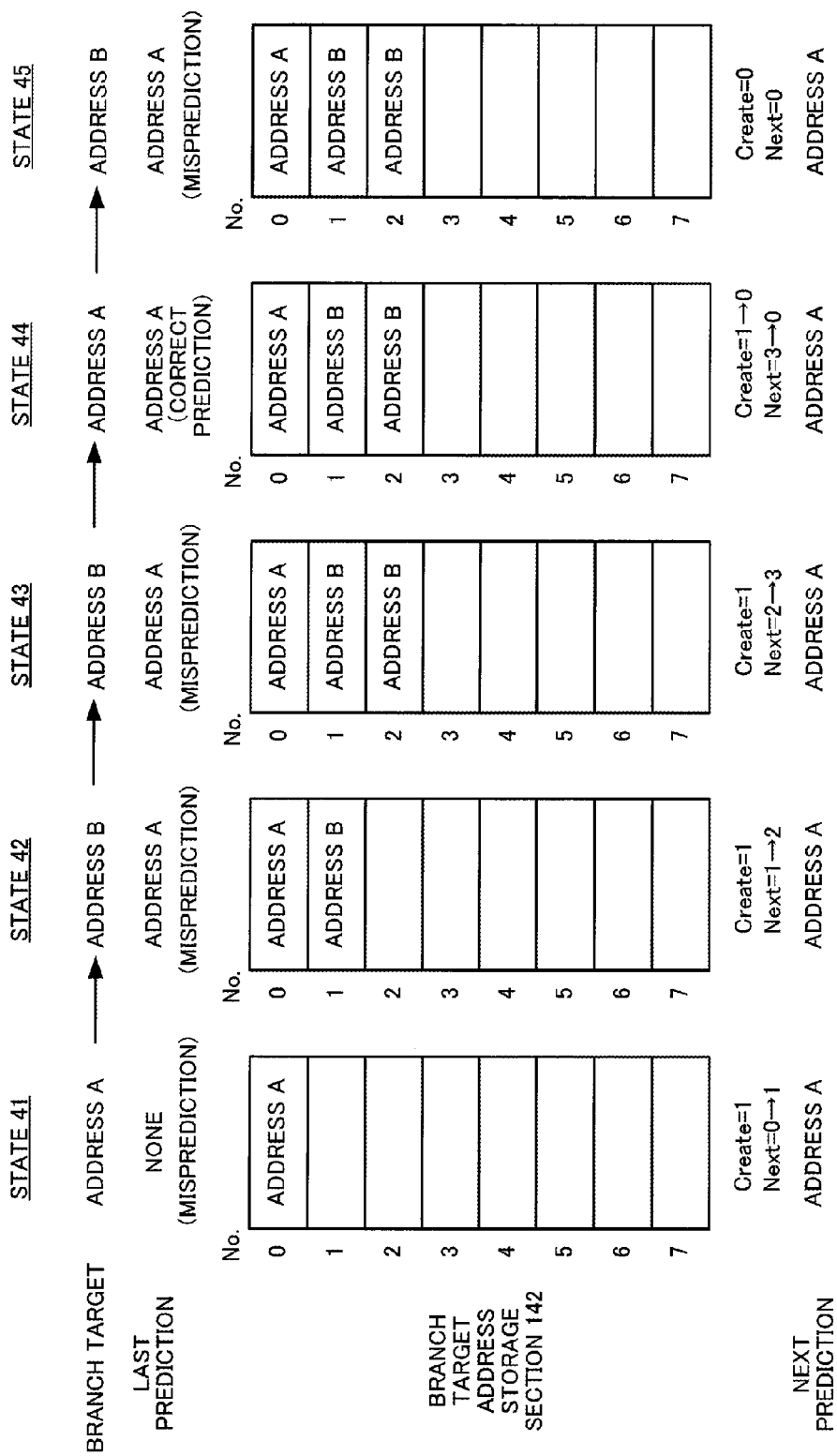
FIG. 24 illustrates a specific example of a branch target prediction process (part 1)
Figure 25:
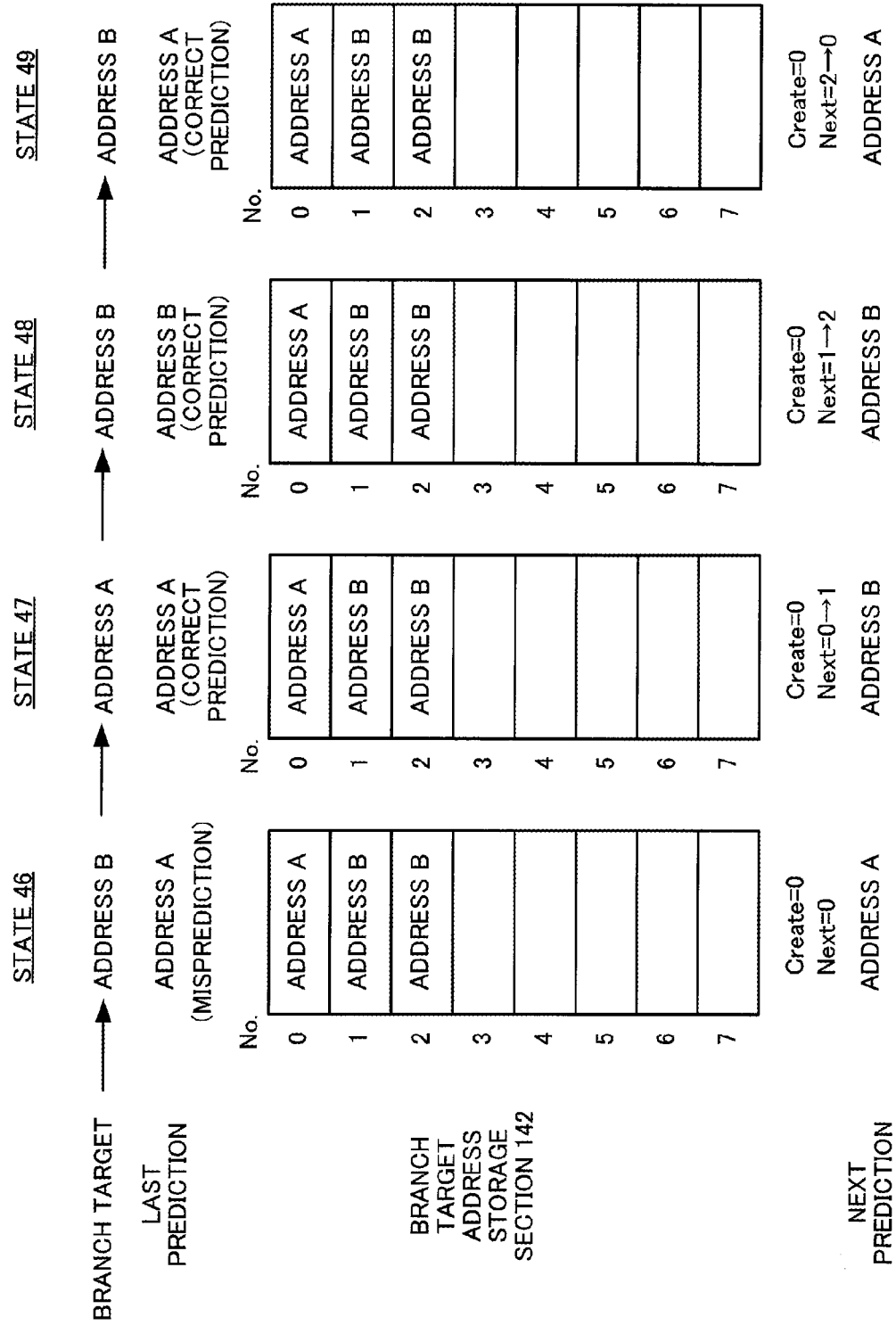
FIG. 25 illustrates the specific example of the branch target prediction process (part 2).

The following describes a specific example of how to predict a branch target with reference to branch target addresses registered in the branch target address table 140c, assuming that the program of FIG. 5 runs. FIGS. 24 and 25 illustrate a specific example of a branch target prediction process.

Similarly to FIGS. 20 and 21, in FIGS. 24 and 25, it is assumed, by way of example, that executions of a table jump instruction result in the instruction addresses of branch targets appearing in a recurring pattern of addresses A, B, and B.

First, assume in FIG. 24 that execution of a table jump instruction makes a transition from a state where no branch target address is registered in the branch target address storage section 142 to a state 41 where the address A is determined as a branch target. In this state, the branch target prediction is a misprediction (yes at S81 of FIG. 23), and the Create flag is "1" (yes at S83). Therefore, the address A, which is a branch target, is registered in the first entry (entry 0) pointed by the Next pointer out of the entries of the branch target address storage section 142 (S84). In addition, the Next pointer is incremented by "1" (S85), and the address A registered in the entry 0 is output as a predicted branch target address (S86).

Then, assume that execution of the table jump instruction at the same address shifts the state to a state 42 where the address B is determined as a branch target. In this state, the branch target prediction is a misprediction (yes at S81), and the Create flag is "1" (yes at S83). Therefore, the address B, which is a branch target, is registered in the entry 1 pointed by the Next pointer (S84). In addition, the Next pointer is incremented to "2" (S85), and the address A registered in the entry 0 is output as a predicted branch target address (S86).

Similarly, in a state 43 where the address B is determined as a branch target, the branch target prediction is a misprediction (yes at S81), and the Create flag is "1" (yes at S83). Therefore, the address B, which is a branch target, is registered in the entry 2 pointed by the Next pointer (S84). In addition, the Next pointer is incremented to "3" (S85), and the address A registered in the entry 0 is output as a predicted branch target address (S86).

Then, in a state 44 where the address A is determined as a branch target, the branch target prediction is correct (no at S81), and the Create flag is updated to "0" (S89). In this state, the upper limit register 144 is set to "2" that is the number of valid entries in the branch target address storage section 142 (S90), and the Next pointer is incremented to "4" (S91). However, the value of the Next pointer exceeds the upper limit value set in the upper limit register 144 (no at S92). Therefore, the Next pointer is returned to "0" (S87). In addition, since the Create flag is "0", the branch target address (address A) registered in the entry pointed by the Next pointer is output as a predicted branch target address (S93). In this connection, since the Create flag is "0" in the state 44, branch target addresses are no more registered in the branch target address storage section 142 after that.

Then, in a state 45 where the address B is determined as a branch target, the branch target prediction is a misprediction (yes at S81). In this state, since the Create flag is "0" (no at S83), the Next pointer keeps its value of "0" (S87), and the branch target address (address A) registered in the entry 0 pointed by the Next pointer is output as a predicted branch target address (S93). In addition, as illustrated in FIG. 25, in a state 46 where the address B is determined as a branch target address, the same operation as in the state 45 is performed.

Then, in a state 47 where the address A is determined as a branch target, the branch target prediction is correct (no at S81). In this state, since the Create flag is "0" (no at S83), the Next pointer is incremented to "1" (S91), and the branch target address (address B) registered in the entry 1 pointed by the Next pointer is output as a predicted branch target address (S93).

Then, even in a state 48 where the address B is determined as a branch target address, the branch target prediction is correct, and the Next pointer is incremented to "2". Further, in a state 49 where the address B is determined as a branch target address, the branch target prediction is correct. In this state, the value obtained by incrementing the Next pointer by "1" (S91) exceeds the value of the upper limit register 144 (S92), and therefore the Next pointer is returned to "0" (S87). Therefore, the branch target address registered in the entry 0 of the branch target address storage section 142 is output as a predicted branch target address.

After that, a correct branch target prediction continues while the branch target address appears in the recurring pattern of addresses A, B, and B. That is, similarly to the fourth embodiment, the process of FIG. 23 makes it possible to predict a branch target for an appearance pattern of instruction addresses, A, B, and B, which has a more flexibility than the predictable pattern described in the second embodiment.

In addition, compared with the fourth embodiment, the fifth embodiment takes a longer time until a correct branch target prediction starts to continue.

However, the fifth embodiment streamlines the processes performed by the table management unit 152c, including registration of branch target addresses in the branch target address storage section 142 and selection of an entry for outputting a predicted branch target address therefrom.

The above-described fifth embodiment is able to provide the same effects as the second to fourth embodiments that provide the effect of predicting a branch target of a table jump instruction and thus make it possible to suppress an increase in manufacturing and development costs and also in the size of a circuit. In addition, compared with the second embodiment, the fifth embodiment makes it possible to predict a branch target for a more flexible appearance pattern of instruction addresses, thus improving prediction accuracy.

In this connection, in the above-described second to fifth embodiments, the branch prediction table 131 and the branch target address tables provided for respective branch instruction addresses are arranged separately. Alternatively, these branch prediction table 131 and branch target address tables may be configured as one table. For example, a plurality of branch target address tables and ways corresponding to the respective branch target address tables in the branch prediction table 131 may directly be linked to each other, not via the table selection unit 153 or the branch prediction control unit 134.

The disclosed arithmetic processing apparatus and branch prediction method make it possible to predict a branch target of a branch instruction that has a plurality of branch targets.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An arithmetic processing apparatus comprising:
   a plurality of branch target address tables provided for respective branch instructions each having a plurality of branch targets and configured to store a history of a plurality of branch target addresses determined in a past by executing the respective branch instructions; and
   a branch target prediction unit configured to predict a predicted branch target address with respect to a branch instruction with reference to the history of the branch target addresses stored in a branch target address table corresponding to the branch instruction;
   wherein:
   in a first period before a branch target prediction based on a predicted branch target address predicted by the branch target prediction unit with respect to a branch instruction that completed execution is correct for first time, the branch target prediction unit sequentially registers, each time the branch instruction completes execution, a branch target address determined based on the completed branch instruction in an entry in order from a topmost entry of a branch target address table corresponding to the completed branch instruction, and outputs a branch target address registered in the topmost entry of the branch target address table corresponding to the completed branch instruction, as the predicted branch target address, and
   in a second period after the branch target prediction based on the predicted branch target address predicted by the branch target prediction unit with respect to the branch instruction that completed execution is correct for the first time, the branch target prediction unit sequentially selects, each time the branch instruction completes execution, an entry having a branch target address registered therein, in order from a topmost one of entries of the branch target address table corresponding to the completed branch instruction, and outputs a branch target address registered in the selected entry, as the predicted branch target address.

2. The arithmetic processing apparatus according to claim 1, further comprising:
   a predicted branch target address storage unit configured to store predicted branch target addresses for the respective branch instructions; and
   an address registration unit configured to register the predicted branch target address predicted by the branch target prediction unit in association with an address of the branch instruction corresponding to the predicted branch target address in the predicted branch target address storage unit.

3. The arithmetic processing apparatus according to claim 2, further comprising an instruction fetch control unit configured to obtain, when a branch instruction is fetched from a memory, a predicted branch target address stored in association with the branch instruction to be fetched, from the predicted branch target address storage unit as an address of an instruction to be fetched next.

4. The arithmetic processing apparatus according to claim 2, wherein, when a branch instruction completes execution, a predicted branch target address with respect to the completed branch instruction is predicted by the branch target prediction unit, and is registered in the predicted branch target address storage unit.

5. The arithmetic processing apparatus according to claim 1, wherein, when a branch instruction completes execution, the branch target prediction unit predicts a predicted branch target address with respect to the completed branch instruction.

6. The arithmetic processing apparatus according to claim 1, wherein the branch target prediction unit outputs, as the predicted branch target address, a branch target address registered in each of the branch target address tables, in order of registration.

7. The arithmetic processing apparatus according to claim 1, wherein, when a branch instruction completes execution, the branch target prediction unit
   searches a branch target address table corresponding to the completed branch instruction for an entry where a same address as a branch target determined based on the completed branch instruction is registered,
   registers, upon detecting no entry where the same address is registered, the branch target address determined based on the completed branch instruction in a first free entry out of free entries of the branch target address table corresponding to the completed branch instruction, and outputs the branch target address stored in the topmost entry of the branch target address table, as the predicted branch target address, and
   outputs, upon detecting the entry where the same address is registered, a branch target address stored in an entry next to the detected entry, as the predicted branch target address.

8. The arithmetic processing apparatus according to claim 1, wherein, when a branch instruction completes execution, the branch target prediction unit
   selects, upon determining that a branch target prediction based on a predicted branch target address predicted by the branch target prediction unit with respect to the completed branch instruction is correct, an entry next to an entry selected when the branch instruction completed execution last time, from a branch target address table corresponding to the completed branch instruction, and outputs a branch target address stored in the current selected entry, as the predicted branch target address, and
   outputs, upon determining that the branch target prediction based on the predicted branch target address predicted by the branch target prediction unit with respect to the completed branch instruction is a misprediction, a branch target address stored in a topmost entry of the branch target address table corresponding to the completed branch instruction, as the predicted branch target address.

9. The arithmetic processing apparatus according to claim 1, wherein:
   the branch target prediction unit sequentially registers a branch target address determined based on a branch instruction that has completed execution, in an entry in order from a topmost entry of a branch target address table corresponding to the completed branch instruction until the branch target address table has no free entries; and
   when a branch instruction completes execution, the branch target prediction unit
   selects, upon determining that a branch target prediction based on a predicted branch target address predicted by the branch target prediction unit with respect to the completed branch instruction is a misprediction, a topmost entry of a branch target address table corresponding to the completed branch instruction, and outputs a branch target address registered in the current selected entry, as the predicted branch target address, and
   selects, upon determining that the branch target prediction based on the predicted branch target address predicted by the branch target prediction unit with respect to the completed branch instruction is correct, an entry next to an entry selected last time from the branch target address table corresponding to the completed branch instruction, and outputs a branch target address registered in the current selected entry, as the predicted branch target address.

10. The arithmetic processing apparatus according to claim 1, wherein, when the branch instruction completes execution in the second period and a branch target prediction based on a predicted branch target address predicted by the branch target prediction unit with respect to the completed branch instruction is a misprediction, the branch target prediction unit outputs the branch target address registered in the topmost entry of the branch target address table corresponding to the completed branch instruction, as the predicted branch target address.

11. The arithmetic processing apparatus according to claim 1, further comprising:
    a plurality of pointers provided for the respective branch instructions and configured to point to an entry of the branch target address tables corresponding to the respective branch instructions, wherein:
    when the branch instruction completes execution in the first period, the branch target prediction unit sets a pointer corresponding to the completed branch instruction so as to point to the topmost entry of the branch target address table corresponding to the completed branch instruction, and outputs a branch target address registered in an entry pointed by the pointer, as the predicted branch target address; and
    when the branch instruction completes execution in the second period, the branch target prediction unit
    sets, upon determining that the branch target prediction based on the predicted branch target address predicted by the branch target prediction unit with respect to the completed branch instruction is correct, the pointer corresponding to the completed branch instruction so as to point to a next entry in the branch target address table corresponding to the completed branch instruction, and outputs a branch target address registered in the entry pointed by the pointer, as the predicted branch target address, and
    sets, upon determining that the branch target prediction based on the predicted branch target address predicted by the branch target prediction unit with respect to the completed branch instruction is a misprediction, the pointer corresponding to the completed branch instruction so as to point to the topmost entry of the branch target address table corresponding to the completed branch instruction, and outputs the branch target address registered in the entry pointed by the pointer, as the predicted branch target address.

12. The arithmetic processing apparatus according to claim 1, further comprising
    a plurality of pointers provided for the respective branch instructions and configured to point to an entry of the branch target address tables corresponding to the respective branch instructions, wherein:

when the branch instruction completes execution in the first period, the branch target prediction unit registers a branch target address in an entry pointed by a pointer in the branch target address table corresponding to the completed branch instruction, and sets the pointer corresponding to the completed branch instruction so as to point to a next entry in the branch target address table corresponding to the completed branch instruction; and when a branch instruction completes execution in the second period, the branch target prediction unit sets, upon determining that the branch target prediction based on the predicted branch target address predicted by the branch target prediction unit with respect to the completed branch instruction is correct, the pointer corresponding to the completed branch instruction so as to point to a next entry in the branch target address table corresponding to the completed branch instruction, and outputs the branch target address registered in the entry pointed by the pointer, as the predicted branch target address, and sets, upon determining that the branch target prediction based on the predicted branch target address predicted by the branch target prediction unit with respect to the completed branch instruction is a misprediction, the pointer corresponding to the completed branch instruction so as to point to the topmost entry in the branch target address table corresponding to the completed branch instruction, and outputs the branch target address registered in the entry pointed by the pointer, as the predicted branch target address.

13. The arithmetic processing apparatus according to claim 12, wherein:

when the branch instruction completes execution in the second period and the branch target prediction based on the predicted branch target address predicted by the branch target prediction unit with respect to the completed branch instruction is correct, the branch target prediction unit updates the pointer corresponding to the completed branch instruction so as to point to a next entry in the branch target address table corresponding to the completed branch instruction, outputs, when a branch target address is registered in the entry pointed by the updated pointer, the branch target address registered in the entry pointed by the pointer, as the predicted branch target address, and sets, when no branch target address is registered in the entry pointed by the updated pointer, the pointer corresponding to the completed branch instruction so as to point to the topmost entry of the branch target address table corresponding to the completed branch instruction, and outputs the branch target address registered in the entry pointed by the pointer, as the predicted branch target address.

14. A branch prediction method comprising:

referring, by an arithmetic processing apparatus, to a plurality of branch target address tables provided for respective branch instructions each having a plurality of branch targets and configured to store a history of a plurality of branch target addresses determined in a past by executing the respective branch instructions;

predicting, by the arithmetic processing apparatus, a predicted branch target address with respect to a branch instruction with reference to the history of the branch target addresses stored in a branch target address table corresponding to the branch instruction;

in a first period before a branch target prediction based on a predicted branch target address predicted with respect to a branch instruction that completed execution is correct for first time, and each time the branch instruction completes execution, sequentially registering a branch target address determined based on the completed branch instruction in an entry in order from a topmost entry of a branch target address table corresponding to the completed branch instruction, and outputs a branch target address registered in the topmost entry of the branch target address table corresponding to the completed branch instruction, as the predicted branch target address; and in a second period after the branch target prediction based on the predicted branch target address predicted with respect to the branch instruction that completed execution is correct for the first time, and each time the branch instruction completes execution, sequentially selecting an entry having a branch target address registered therein, in order from a topmost one of entries of the branch target address table corresponding to the completed branch instruction, and outputs a branch target address registered in the selected entry, as the predicted branch target address.

* * * * *